US012531326B2

(12) United States Patent
Zhang et al.

(10) Patent No.: US 12,531,326 B2
(45) Date of Patent: Jan. 20, 2026

(54) BASE STATION ANTENNA

(71) Applicant: HUAWEI TECHNOLOGIES CO., LTD., Guangdong (CN)

(72) Inventors: Xun Zhang, Shenzhen (CN); Wenao Li, Shenzhen (CN); Jianping Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 247 days.

(21) Appl. No.: 18/342,696

(22) Filed: Jun. 27, 2023

(65) Prior Publication Data

US 2023/0344113 A1 Oct. 26, 2023

Related U.S. Application Data

(63) Continuation of application No. PCT/CN2020/140423, filed on Dec. 28, 2020.

(51) Int. Cl.

*H01Q 1/24* (2006.01)
*H01P 1/18* (2006.01)
*H01Q 19/10* (2006.01)
*H01Q 21/24* (2006.01)

(52) U.S. Cl.

CPC ............... *H01Q 1/246* (2013.01); *H01P 1/18* (2013.01); *H01Q 19/10* (2013.01); *H01Q 21/24* (2013.01)

(58) Field of Classification Search

CPC ........ H01Q 1/50; H01Q 1/246; H01Q 1/1228; H01Q 3/30; H01Q 3/34; H01Q 19/10; H01Q 21/0006; H01Q 21/24; H01Q 21/065

See application file for complete search history.

(56) References Cited

U.S. PATENT DOCUMENTS

| | | | | |
|---|---|---|---|---|
| 6,593,891 | B2 * | 7/2003 | Zhang | H01Q 9/0457 343/846 |
| 11,133,586 | B2 * | 9/2021 | Shen | H01Q 21/061 |
| 12,034,227 | B2 * | 7/2024 | Michaelis | H01Q 19/06 |
| 2007/0229385 | A1 * | 10/2007 | Deng | H01Q 21/062 343/810 |
| 2012/0280874 | A1 * | 11/2012 | Kim | H01Q 21/08 343/763 |
| 2014/0225792 | A1 | 8/2014 | Lee et al. | |
| 2015/0263431 | A1 | 9/2015 | Moon et al. | |
| 2017/0125917 | A1 * | 5/2017 | Lin | H01Q 9/16 |

(Continued)

FOREIGN PATENT DOCUMENTS

| | | |
|---|---|---|
| CN | 110165397 A | 8/2019 |

*Primary Examiner* — Tung X Le

(57) ABSTRACT

A base station antenna is disclosed. The base station antenna includes a feed mechanism and at least one antenna module. Each antenna module includes at least two antenna units, and each antenna unit has a first sub-radiation phase slope. In each antenna module, first sub-radiation phase slopes of the at least two antenna units are different, and each antenna unit is connected to the feed mechanism through a corresponding feeder that is in a one-to-one correspondence with the antenna unit, where the feeder has a second sub-radiation phase slope. The antenna unit and the corresponding feeder form one radiating element, and a radiation phase slope of each radiating element is a sum of the first sub-radiation phase slope of the antenna unit and the second sub-radiation phase slope of the corresponding feeder.

20 Claims, 15 Drawing Sheets

(56) References Cited

U.S. PATENT DOCUMENTS

| | | | | |
|---|---|---|---|---|
| 2021/0029556 | A1* | 1/2021 | Wu | H01Q 19/106 |
| 2021/0305697 | A1* | 9/2021 | Chen | H01Q 1/521 |
| 2023/0065251 | A1* | 3/2023 | Wayton | H01Q 1/246 |

* cited by examiner

BASE STATION ANTENNA

CROSS-REFERENCE TO RELATED APPLICATIONS

This application is a continuation of International Application No. PCT/CN2020/140423, filed on Dec. 28, 2020, the disclosure of which is hereby incorporated by reference in its entirety.

TECHNICAL FIELD

This application relates to the field of antenna technologies, and in particular, to a base station antenna.

BACKGROUND

A base station antenna is a key part of a wireless communication system, and performance of the base station antenna directly determines communication quality of the wireless system. In many base station antennas, especially in massive multiple-input multiple-output base station antennas, antenna units are fed in a vertical dimension in a form of 1-to-N power splitting, to form a 1-to-N module. The 1-to-N module includes N same antenna units, and unit radiation phase slopes of the N same antenna units are consistent.

To ensure normal radiation of the base station antenna, radiation phases of antenna units need to meet a specific relationship. To be specific, feeder lengths from a 1-to-N power splitting input port to the antenna units need to meet a specific relationship (equal length, linear increase, or linear decrease). However, in an actual layout, because the antenna units have different distances from the power splitting input port, to meet a relationship between the feeder lengths, a length of a feeder connected to an antenna unit close to the power splitting input port needs to be extended to be consistent with a length of a feeder connected to an antenna unit far away from the power splitting input port. This causes difficulty in a feeder layout and increase in loss of a feed network. The feed network is a network constituted by many feeder direction layouts.

Therefore, how to simplify a feeder cabling layout in the base station antenna and reduce loss of the feed network when the normal radiation of the base station antenna is ensured is an urgent problem to be resolved.

SUMMARY

This application provides a base station antenna, to simplify a feeder cabling layout in the base station antenna and reduce a loss of a feed network when normal radiation of the base station antenna is ensured.

This application provides a base station antenna, where the base station antenna includes a feed mechanism and at least one antenna module, each antenna module includes at least two antenna units, and each antenna unit has a first sub-radiation phase slope; and in each antenna unit, each antenna unit is connected to the feed mechanism through a feeder that is in a one-to-one correspondence with the antenna unit, and each feeder has a second sub-radiation phase slope. Specifically, the antenna unit and the feeder in pairs that are in a one-to-one correspondence form one radiating element, and each radiating element has a radiation phase slope. The radiation phase slope is equal to a sum of a first sub-radiation phase slope of an antenna unit and a second sub-radiation phase slope of a feeder that is in a one-to-one correspondence with the antenna unit. It should be understood that first sub-radiation phase slopes of different antenna units in the antenna module may be adjusted, and the second sub-radiation phase slope of the feeder connected to each antenna unit may be adjusted, to enable a difference between radiation phase slopes of radiating elements in each antenna module to meet a first preset value.

On a premise that the first preset value is met, the base station antenna provided in this application changes a type or a form of the antenna unit in the antenna module, so that there is a difference between the first sub-radiation phase slopes of the antenna units in the antenna module. Therefore, second sub-radiation phase slopes of feeders connected to different antenna units may be different. Based on this, lengths of the feeders connected to the antenna units in each antenna module may be different. Specifically, a feeder connected to an antenna unit close to the feed mechanism may be short, and a feeder connected to an antenna unit far away from the feed mechanism may be long. Clearly, the base station antenna provided in this application can simplify and shorten a feeder length of a specific feed network, so that the feeder cabling layout in the antenna is simplified and the loss of the feed network is reduced when the normal radiation of the base station antenna is ensured.

During disposing of the antenna units in the antenna module, in a specific implementation, different types of antenna units may be selected, to enable the first sub-radiation phase slopes of the antenna units in the antenna module to be different. For example, when the antenna module includes only two antenna units, the two antenna units may be selected as different types, to enable the two antenna units to have different first sub-radiation phase slopes. In another specific implementation, a plurality of antenna units in the antenna module may be selected as a same type, to maintain that main parts of the antenna units are the same. However, the antenna units are provided with different director plates and/or different radiation arms. In this way, the first sub-radiation phase slopes of the at least two antenna units are different. During specific disposing of antenna units that have different first sub-radiation phase slopes in each antenna module, a phase difference on a center frequency between the antenna units that have different first sub-radiation phase slopes may be set to be greater than or equal to 180°. In addition, each antenna unit in the antenna module may be set as a ±45° dual-polarized antenna, to increase a coverage area of the base station antenna.

It should be noted that, during specific disposing of the antenna module, whether there is a downtilt angle between the antenna units in the antenna module may be set based on a requirement. Specifically, when the first preset value is 0, there is no difference between the radiation phase slopes of the radiating elements, and there is no downtilt angle between the antenna units. When the first preset value is greater than 0, there is a difference between the radiation phase slopes of the radiating elements, and there is a downtilt angle between the antenna units. Certainly, when the first preset value is greater than 0, a size of the downtilt angle between the antenna units may be adjusted by changing the first preset value.

During disposing of the feed mechanism, feeding may be specifically performed through a plurality of structures, and at least the following manners are included.

Manner 1: The feed mechanism includes a feeding port, and the antenna unit in the antenna module is connected to the feeding port through the feeder that is in a one-to-one correspondence with the antenna unit.

Specifically, on a premise that the difference between the radiation phase slopes of the radiating elements that each include the antenna unit and the feeder that is in a one-to-one correspondence with the antenna unit meets the first preset value, an antenna unit structure in the antenna module may be adjusted, so that there is a difference between the first sub-radiation phase slopes of the antenna units. Therefore, the second sub-radiation phase slopes of the feeders may be different. Based on this, antenna units at different positions from the feeding port can be connected through feeders with different lengths, so that a feeder length of a specific feed network can be simplified and shortened. For example, an antenna unit close to the feeding port is connected to the feeding port through a short feeder. An antenna unit far away from the feeding port is connected to the feeding port through a long feeder.

According to the structure in Manner 1, the feeder cabling layout in the antenna is simplified and the loss of the feed network is reduced when the normal radiation of the base station antenna is ensured.

Manner 2: The feed mechanism includes a feeding port, a phase shifter, and a connection cable. The antenna unit in the antenna module is connected to the feeding port through the feeder that is in a one-to-one correspondence with the antenna unit. The phase shifter is provided with a plurality of output ports. A feeding port connected to each antenna module is connected to one output port through a connection cable that is in a one-to-one correspondence with the feeding port. The connection cable has a third sub-radiation phase slope. It should be noted that output ports connected to different feeding ports are different. In the antenna module and the connection cable in pairs that are in a one-to-one correspondence, a sum of the radiation phase slopes of the radiating elements in the antenna module forms a module radiation phase slope, and a sum of the module radiation phase slope and the third sub-radiation phase slope forms a total radiation phase slope. A difference between total radiation phase slopes formed by antenna modules and connection cables that are in a one-to-one correspondence meets a second preset value. It should be understood that the connection cable herein is also used as a cable in the feed network, the connection cable and the feeder herein are just different expressions.

Specifically, a connection cable length, a structure of the antenna unit in the antenna module, and a length of the feeder that is in a one-to-one correspondence with the antenna unit may be adjusted, to enable the difference between the total radiation phase slopes formed by the antenna modules and the connection cables that are in a one-to-one correspondence meets the second preset value. Based on this, lengths of feeders may be different, and lengths of connection cables may also be different, so that a feeder length of a specific feed network can be simplified and shortened. For example, an antenna module close to an output port is connected to a feeding port that is in a one-to-one correspondence with the antenna module through a short connection cable. An antenna module far away from an output port is connected to a feeding port that is in a one-to-one correspondence with the antenna module through a long connection cable.

According to the structure in Manner 2, the feeder cabling layout in the antenna is simplified and the loss of the feed network is reduced when the normal radiation of the base station antenna is ensured.

During specific disposing, whether there is a downtilt angle between the antenna modules may be set based on a requirement. Specifically, when the second preset value met by the difference between the total radiation phase slopes is set to 0, there is no downtilt angle between the antenna modules. When the second preset value met by the difference between the total radiation phase slopes is set to be greater than 0, there is a downtilt angle between the antenna modules. Certainly, when the second preset value is greater than 0, a size of the downtilt angle between the antenna modules may be adjusted by changing the second preset value.

For the structures in the foregoing Manner 1 and Manner 2, a dielectric substrate may be disposed to carry the antenna module. For example, the dielectric substrate has a first surface and a second surface. The feeding port is disposed on the first surface, and a signal ground is disposed on the second surface. The antenna module is disposed on the dielectric substrate, and the antenna unit in the antenna module is connected to the signal ground. It should be noted that the feeder is a microstrip formed on the dielectric substrate. The feeder is connected to the feeding port and the antenna unit, to implement signal transmission between the antenna unit and the feeding port.

Manner 3: The feed mechanism includes a phase shifter. The antenna unit in the antenna module is connected to one output port of the phase shifter through the feeder that is in a one-to-one correspondence with the antenna unit, and the antenna units are connected to different output ports.

Specifically, on a premise that the difference between the radiation phase slopes of the radiating elements in the antenna module meets the first preset value, an antenna unit structure in the antenna module may be adjusted, so that there is a difference between the first sub-radiation phase slopes of the antenna units. Therefore, the second sub-radiation phase slopes of the feeders may be different. Based on this, antenna units at different positions from the feeding port can be connected through feeders with different lengths, so that a feeder length of a specific feed network can be simplified and shortened. For example, an antenna unit close to the output port is connected to the output port through a short feeder. An antenna unit far away from the output port is connected to the output port through a long feeder.

According to the structure in Manner 3, the feeder cabling layout in the antenna is simplified and the loss of the feed network is reduced when the normal radiation of the base station antenna is ensured.

Based on the foregoing Manner 1, Manner 2, and Manner 3, a reflection plate may be further disposed. Specifically, the reflection plate is disposed on a side that is of the antenna unit and that is away from a radiation direction of the antenna unit, to support and fasten the antenna module and reflect an electromagnetic wave to ensure normal radiation of the antenna unit.

DESCRIPTION OF EMBODIMENTS

A base station antenna provided in embodiments of this application may be applicable to various communication systems such as a 5th generation (5G) communication system or a new radio (NR) system, a 6G communication system, a long term evolution (LTE for short) system, a global system of mobile communication (GSM for short) system, a code division multiple access (CDMA for short) system, a wideband code division multiple access (WCDMA for short) system, a general packet radio service (GPRS for short) system, an LTE time division duplex (TDD for short) system, a universal mobile telecommunications system (UMTS for short), a worldwide interoperability for microwave access (WiMAX for short) communication system. Certainly, the various communication systems may also be another communication system in an unlicensed frequency band, which is not limited.

The following describes the technical solutions in detail in embodiments of this application with reference to the accompanying drawings in embodiments of this application. It should be understood that the described embodiments are merely some but not all of embodiments of this application.

Figure 1:
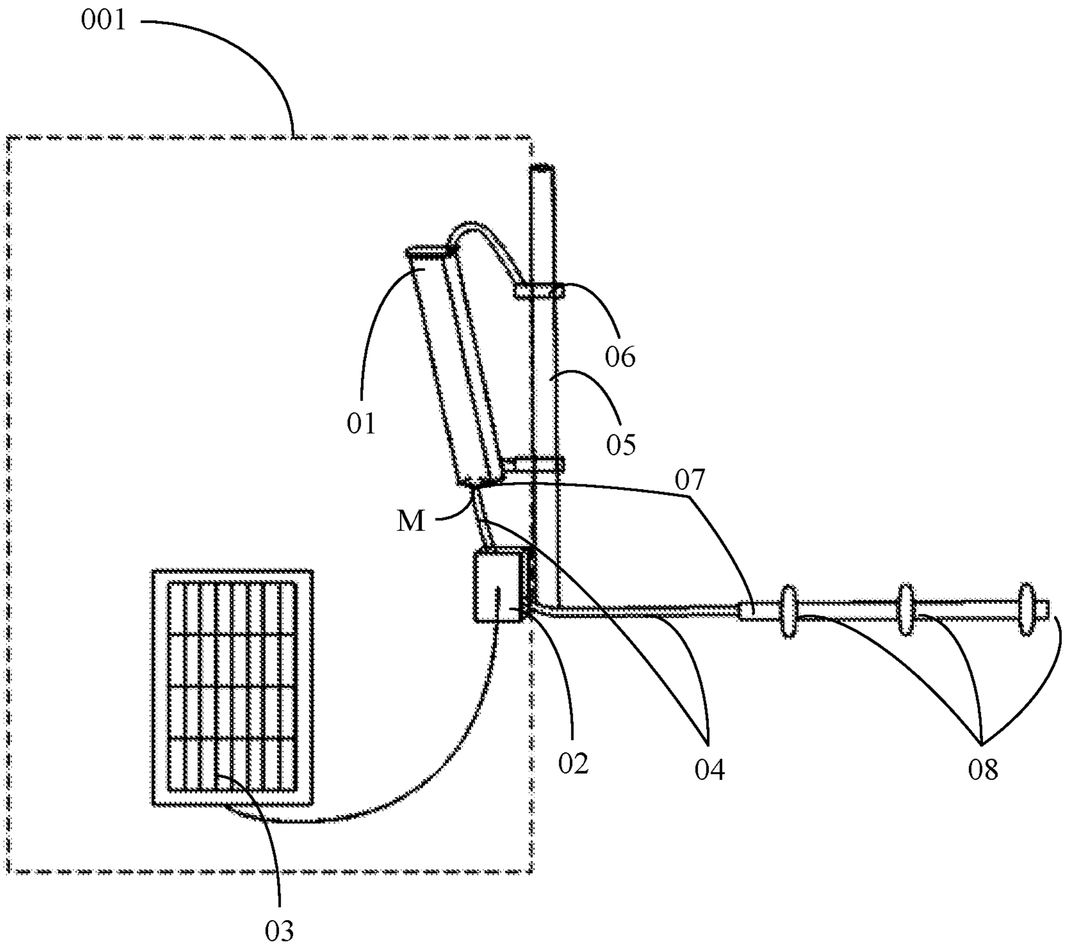
FIG. 1 is a schematic diagram of a system architecture to which an embodiment of this application is applicable.

FIG. 1 is a schematic diagram of a system architecture to which an embodiment of this application is applicable. As shown in FIG. 1, the system architecture may include a radio access network device. For example, the system architecture includes but is not limited to a base station 001 shown in FIG. 1. The radio access network device may be located in a base station subsystem (BSS), a terrestrial radio access network (UMTS terrestrial radio access network, UTRAN), or an evolved universal terrestrial radio access network (E-UTRAN), to be configured to perform cell coverage of a radio signal to implement connection between a terminal device and a radio frequency end of a wireless network. Specifically, the base station 001 may be a base station (base transceiver station, BTS) in a GSM or CDMA system, or may be a base station (NodeB, NB) in a WCDMA system, or may be an evolved NodeB (eNB or eNodeB) in an LTE system, or may be a radio controller in a cloud radio access network (CRAN) scenario. Alternatively, the base station 001 may be a relay station, an access point, a vehicle-mounted device, a wearable device, and a base station in a future 5G network, a base station in a future evolved PLMN network, or the like. This is not limited in embodiments of this application.

As shown in FIG. 1, a possible structure of the base station 001 may include a base station antenna 01, a transceiver 02, and a baseband processing unit 03. The transceiver 02 may be connected to an antenna port M of the base station antenna 01, so that the base station antenna 01 can receive, through the antenna port M of the base station antenna 01, a sending signal sent by the transceiver 02, and radiate the sending signal through a radiator of the base station antenna 01, or send, to the transceiver 02, a receiving signal received by the radiator of the base station antenna 01.

In implementation, the transceiver 02 may be a remote radio frequency unit, and the baseband processing unit 03 may be a baseband unit. Usually, the base station antenna 01 and the remote radio frequency unit are alternatively integrated in a same component, where the component is referred to as an active antenna unit (AAU). In this scenario, the baseband unit may be configured to: process a to-be-sent baseband signal and transmit the to-be-sent baseband signal to the remote radio frequency unit, or receive a receiving signal sent by the remote radio frequency unit (namely, a baseband signal obtained through converting a receiving radio frequency signal received by the base station antenna 01 by the remote radio frequency unit in a signal receiving process) and process the receiving signal. The remote radio frequency unit may convert the to-be-sent baseband signal sent by the baseband unit into a sending radio frequency signal (including performing necessary signal processing, for example, signal amplification, on the to-be-sent baseband signal). Then, the sending radio frequency signal may be sent to the base station antenna 01 through the antenna port M of the base station antenna 01, and the base station antenna 01 radiates the sending radio frequency signal. Alternatively, the remote radio frequency unit may also receive a receiving radio frequency signal sent by the antenna port M of the base station antenna 01, convert the receiving radio frequency signal into a receiving baseband signal, and send the receiving baseband signal to the baseband unit.

It should be understood that FIG. 1 merely shows a connection relationship between one transceiver 02 and one antenna port M of the base station antenna 01. In another optional implementation, there may be at least two antenna ports M in the base station antenna 01, and there may also be at least two transceivers 02. Each antenna port M may be connected to one transceiver 02. A plurality of transceivers 02 may be connected to a same baseband processing unit 03.

FIG. 1 further shows an example of a possible deployment scenario of the base station antenna 01 according to an embodiment of this application. As shown in FIG. 1, the deployment scenario may include the base station antenna 01, a feeder 04, a pole 05, an antenna adjustment support 06, a joint sealing component 07, and a grounding device 08. One end that is of the base station antenna 01 and that is close to the antenna port M may be fastened and connected to the pole 05, and one end that is of the base station antenna

01 and that is away from the antenna port M may be movably connected to the pole 05 through the antenna adjustment support 06, so that a position of the base station antenna 01 can be adjusted through the antenna adjustment support 06. The feeder 04 led out from the antenna port M of the base station antenna 01 is connected to the transceiver 02, and the feeder 04 may further extend to a grounding pipe to connect to the grounding device 08. Sealed connection on a joint between the antenna port M and the feeder 04, and a joint between the feeder 04 and the grounding pipe may be implemented by the joint sealing component 07. It should be understood that FIG. 1 merely shows a deployment manner of the base station antenna 01 that includes one antenna. In another scenario, the base station antenna 01 may alternatively include a plurality of antennas installed around the pole 05. Installation positions of the plurality of antennas may be the same or different. When the installation positions are different, the plurality of antennas may form respective different beam coverage areas.

Figure 2:
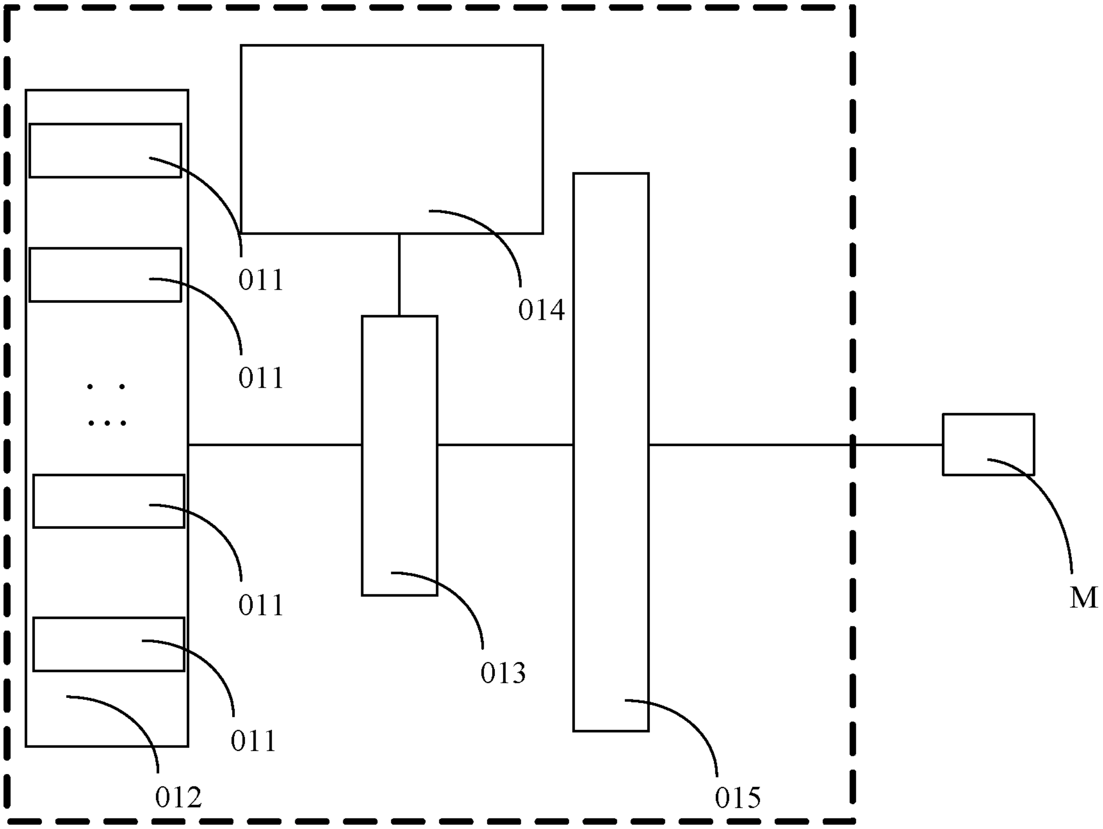
FIG. 2 is a diagram of an internal architecture of a base station antenna in FIG. 1 in the current technology.

FIG. 2 is a diagram of an internal architecture of a base station antenna 01 in FIG. 1 in the current technology. As shown in FIG. 2, the base station antenna 01 includes at least one independent array that includes one or more radiators 011 and a metal reflection plate 012, where frequencies of the radiators 011 may be the same or different. Usually, the radiator 011 is placed on an upper side of the metal reflection plate 012. In other words, the metal reflection plate 012 is disposed on a side that is of the radiator 011 and that is away from a radiation direction. The at least one independent array receives or transmits a radio frequency signal through a feed network of the at least one independent array. The feed network may implement different radiation beam directions by using a transmission part and a transmission part in a calibration network 014, or may be connected to a calibration network in a transmission part and a calibration network 014 to obtain a calibration signal required by a system. In addition to a phase shifter 013, the feed network may further include a module, for example, a combiner or a filter 015, that is used for extending performance and that is connected to the antenna port M.

Figure 3:
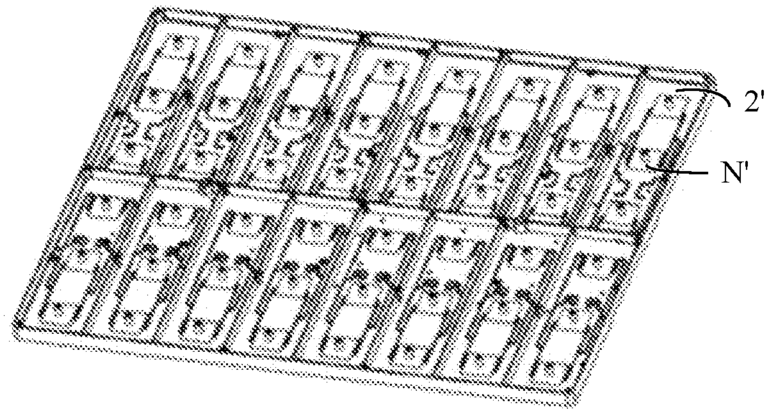
FIG. 3 is a diagram of a structure of a base station antenna in FIG. 1 in the current technology.

FIG. 3 is a diagram of a structure of a base station antenna 01 in FIG. 1 in the current technology. When the base station antenna 01 is specifically disposed, a dielectric substrate 2' shown in FIG. 3 may be placed on the metal reflection plate 012 shown in FIG. 2, and a plurality of 1-to-3 modules N' are formed on the dielectric substrate 2'. It should be understood that the 1-to-3 module N' includes a plurality of radiators 011 shown in FIG. 2. In addition, it should be noted that the dielectric substrate 2' is formed by injection and molding of a high-performance plastic.

Figure 4:
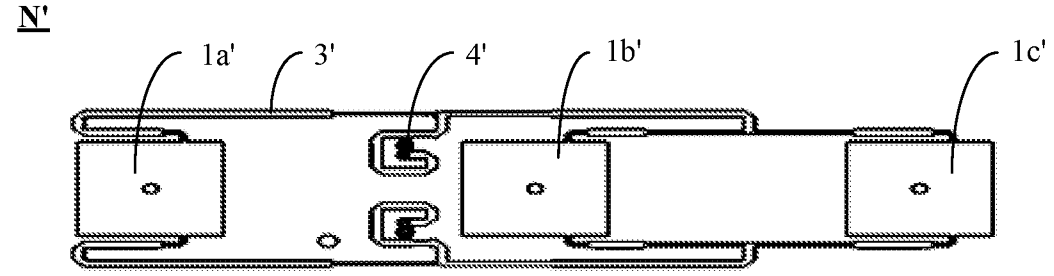
FIG. 4 is a schematic diagram of a structure of one 1-to-3 module in an antenna array in FIG. 3.

FIG. 4 is a schematic diagram of a structure of one 1-to-3 module in FIG. 3. In the structure shown in FIG. 4, the 1-to-3 module N' specifically includes a plurality of antenna units (shown as 1*a*', 1*b*', and 1*c*' in FIG. 4) formed by patches, a feeder 3' and a power splitting main feeding input port 4'. Because three antenna units (1*a*', 1*b*', and 1*c*') use a same patch unit form, first sub-radiation phase slopes of the three antenna units are consistent.

Still refer to the structure shown in FIG. 4. The main feeding input port 4' is close to the antenna unit 1*a*' that is on a left side and far away from the antenna unit 1*c*' that is on the rightmost side. To ensure feeding phase consistency between the three antenna units, the feeder 3' of the antenna unit 1*a*' that is on the leftmost side is bent and wound in a specific manner. Because space allocated to each 1-to-3 module N' in the base station antenna 01 is limited, such bending and winding lead to difficulties in a layout of the feeder 3' and an increased loss of the feed network.

In view of this, this application provides a base station antenna, to simplify a cabling layout of the feed network in the base station antenna and reduce the loss of the feed network when normal radiation of the base station antenna is ensured.

Terms used in the following embodiments are merely intended to describe specific embodiments, but are not intended to limit this application. As used in the specification and the appended claims of this application, singular forms “one”, “a”, “the”, “the foregoing”, “the”, and “this” are also intended to include plural forms such as “one or more”, unless otherwise specified in the context.

Reference to “an embodiment”, “some embodiments”, or the like described in this specification indicates that one or more embodiments of this application include a specific feature, structure, or characteristic described with reference to the embodiment. Therefore, statements such as “in an embodiment”, “in some embodiments”, “in some other embodiments”, and “in other embodiments” that appear at different places in this specification do not necessarily mean referring to a same embodiment. Instead, the statements mean “one or more but not all of embodiments”, unless otherwise specifically emphasized in another manner. The terms “include”, “contain”, “have”, and their variants all mean “include but are not limited to”, unless otherwise specifically emphasized.

The following clearly describes the technical solutions in embodiments of this application with reference to the accompanying drawings in embodiments of this application.

Figure 5:
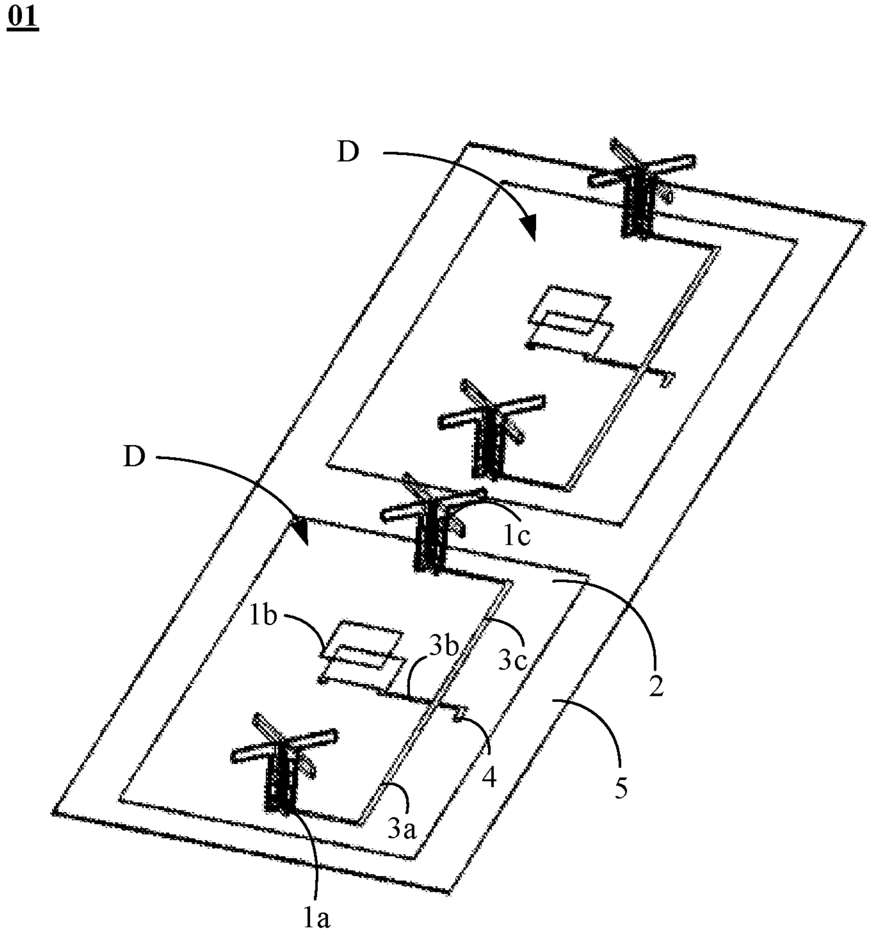
FIG. 5 is a diagram of a structure of a base station antenna according to Embodiment 1 of this application.

FIG. 5 is a diagram of a structure of a base station antenna 01 according to Embodiment 1 of this application. In the structure shown in FIG. 5, the base station antenna 01 includes two antenna modules D, a dielectric substrate 2, and a reflection plate 5. The two antenna modules D form one antenna array. For example, each antenna module D is specifically a 1-to-3 module, to be specific, each antenna module D includes three antenna units. Certainly, the antenna module D may alternatively include another quantity of modules, and details are not described herein again. The foregoing dielectric substrate 2 has a first surface and a second surface. A feeding port 4 serving as a feed mechanism is disposed on the first surface, and a signal ground is disposed on the second surface. It should be noted that the feeding port 4 may be used as a main feeding port of the 1-to-3 module. It should be understood that the 1-to-3 module means that energy transmitted by the feeding port 4 is separately transmitted to three antenna units after power allocation. In addition, the base station antenna 01 is not limited to including only two antenna modules D. Herein, the two antenna modules D are merely examples for description, and another quantity of antenna modules D may alternatively be disposed based on a requirement. Details are not described herein again.

The structure shown in FIG. 5 specifically includes an antenna unit 1*a*, an antenna unit 1*b*, and an antenna unit 1*c*, where the three antenna units are fastened on the first surface of the dielectric substrate 2. The antenna unit 1*a* is connected to the feeding port 4 through a feeder 3*a*. The antenna unit 1*b* is connected to the feeding port 4 through a feeder 3*b*. The antenna unit 1*c* is connected to the feeding port 4 through a feeder 3*c*. In addition, the feeder 3*a*, the feeder 3*b*, and the feeder 3*c* are microstrips formed on the dielectric substrate 2. The antenna unit 1*a*, the antenna unit 1*b*, and the antenna unit 1*c* are all connected to the signal ground of the dielectric substrate 2. The reflection plate 5 is disposed on a side that is of the antenna module D and that is away from a radiation direction of the antenna unit 1*a*, the antenna unit 1*b*, and the antenna unit 1*c*, to support and fasten the antenna module D and reflect an electromagnetic wave. This ensures normal radiation of the antenna unit 1*a*, the antenna unit 1*b*, and the antenna unit 1*c*.

Figure 6:
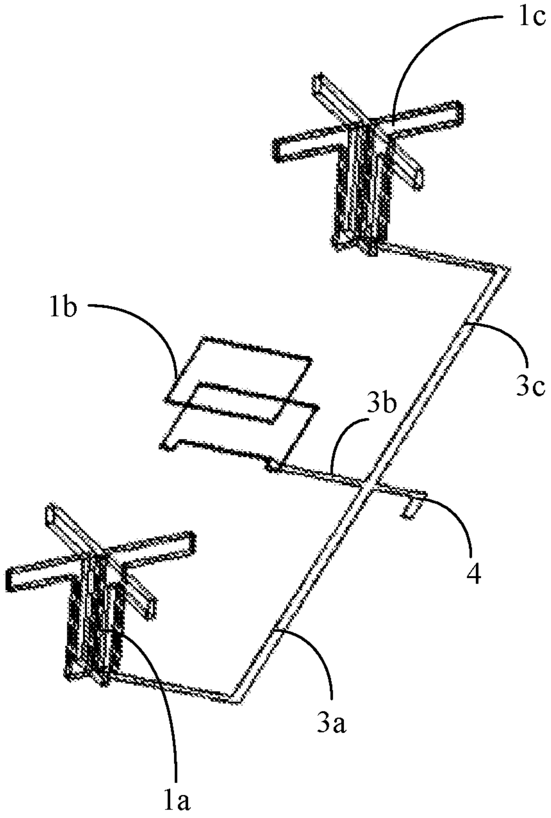
FIG. 6 is a schematic diagram of a partial structure of an antenna module in FIG. 5.

FIG. 6 is a schematic diagram of a partial structure of an antenna module D in FIG. 5. In the structure shown in FIG. 6, an electromagnetic signal is input from the feeding port 4. After the power allocation, feeding is performed, through the feeder 3*a*, the feeder 3*b*, and the feeder 3*c* and based on a specific amplitude and phase, on the antenna unit 1*a*, the antenna unit 1*b*, and the antenna unit 1*c*, to form electromagnetic radiation of the 1-to-3 module. It should be understood that the feeding port 4, the feeder 3*a*, the feeder 3*b*, and the feeder 3*c* in the structure of FIG. 6 form a single polar feed network for one antenna module D.

Figure 7:
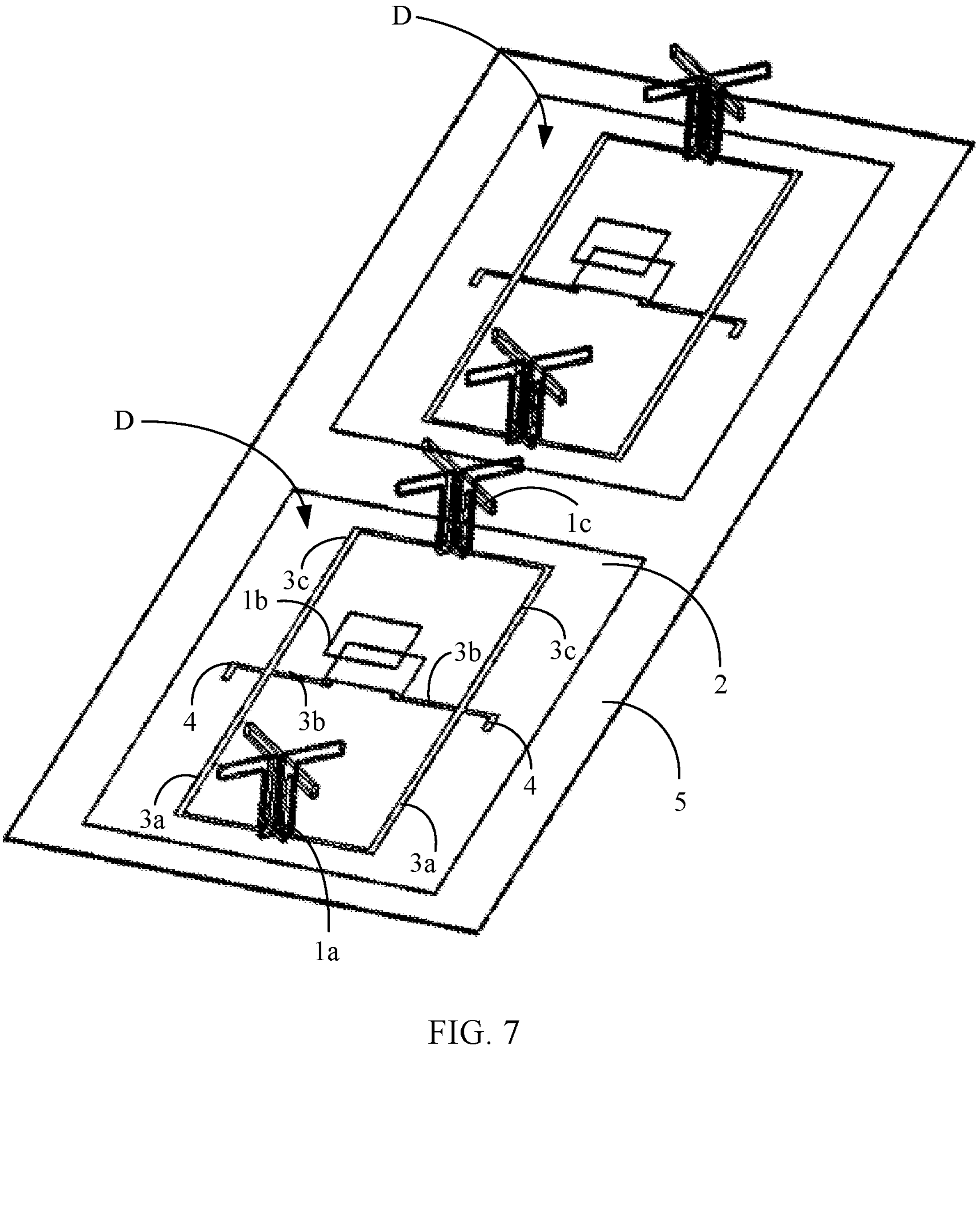
FIG. 7 is a diagram of another structure of a base station antenna according to Embodiment 1 of this application.

It should be noted that in most base station antennas 01, antenna units perform ±45° dual-polarized radiation. The antenna unit 1*a* is used as an example. Each polarization of the antenna unit 1*a* needs to be connected to a separate feed network. Therefore, symmetric feed networks may be separately disposed on the dielectric substrates 2 on both sides of the antenna unit 1*a*. Details are shown in FIG. 7.

It can be learnt from a basic electromagnetic theory that a product of a frequency and a wavelength of an electromagnetic wave is a fixed value (speed of light). In other words, an electromagnetic wave with a high frequency corresponds to a short wavelength, and an electromagnetic wave with a low frequency corresponds to a long wavelength. For electromagnetic waves of all frequencies, one wavelength corresponds to a 360-degree phase change, and a phase of an electromagnetic wave periodically changes in a range from 0 to 360. For a section of a feeder with a fixed length, a quantity of wavelengths that the electromagnetic wave with a high frequency passes through during transmission is greater than a quantity of wavelengths that the electromagnetic wave with a low frequency passes through. Therefore, a phase variation amount of the electromagnetic wave with a high frequency is larger. In other words, a phase variation of the electromagnetic wave with a high frequency is faster. A correspondence between the phase variation amount and the frequency is drawn with a slash, and then a phase slope can be obtained.

To explain the foregoing theory more clearly, the antenna unit 1*a* is used as an example for description herein. When feeding is performed at a root of the antenna unit 1*a*, an electromagnetic wave is transmitted on a structure of the antenna unit 1*a*, and then is radiated to free space. A first sub-radiation phase slope of the antenna unit 1*a* may be obtained by observing a relationship between a frequency and a phase of the electromagnetic wave at a point in the space. Usually, at a same observation point, when antenna units 1*a* are selected in the antenna modules D, first sub-radiation phase slopes of the antenna units 1*a* are the same. When the antenna unit 1*a* and the antenna unit 1*b* that are different are selected in the antenna modules D, first sub-radiation phase slopes of the antenna unit 1*a* and the antenna unit 1*b* are different.

Still refer to the structure shown in FIG. 6. Among the three antenna units included in the 1-to-3 module, the antenna unit 1*a* and the antenna unit 1*c* are identical antenna units, but the antenna unit 1*b* is completely different from the antenna unit 1*a* and the antenna unit 1*c*. For example, when the antenna module D is disposed, it may be set that a phase difference on a center frequency between the antenna unit 1*a* (or the antenna unit 1*c*) and the antenna unit 1*b* is greater than or equal to 180°. With reference to the foregoing analysis, it can be learned that the first sub-radiation phase slopes of the antenna unit 1*a* and the antenna unit 1*c* shown in FIG. 6 are consistent. The first sub-radiation phase slope of the antenna unit 1*b* is different from the first sub-radiation phase slopes of the antenna unit 1*a* and the antenna unit 1*c*.

In the structure shown in FIG. 6, the antenna unit 1*a* and the feeder 3*a* form one radiating element, the radiating element has a first radiation phase slope, and the first radiation phase slope is equal to a sum of the first sub-radiation phase slope of the antenna unit 1*a* and a second sub-radiation phase slope of the feeder 3*a*. Similarly, the antenna unit 1*b* and the feeder 3*b* form one radiating element, the radiating element has a second radiation phase slope, and the second radiation phase slope is equal to a sum of the first sub-radiation phase slope of the antenna unit 1*b* and a second sub-radiation phase slope of the feeder 3*b*. The antenna unit 1*c* and the feeder 3*c* form one radiating element, the radiating element has a third radiation phase slope, and the third radiation phase slope is equal to a sum of the first sub-radiation phase slope of the antenna unit 1*c* and a second sub-radiation phase slope of the feeder 3*c*.

It can be learnt from basic knowledge of electromagnetism that, in order to obtain good wideband antenna radiation, phase slopes of electromagnetic waves radiated by radiating elements need to meet a specific relationship. In Embodiment 1 of this application, for example, it is set that there is no difference between radiation phase slopes of the radiating elements in the antenna module D. To be specific, a difference between the first radiation phase slope, the second radiation phase slope, and the third radiation phase slope is 0 (that is, a first preset value is 0).

Because the difference between the first radiation phase slope, the second radiation phase slope, and the third radiation phase slope is 0, the first sub-radiation phase slopes of the antenna unit 1*a* and the antenna unit 1*c* shown in FIG. 6 are consistent, and the first sub-radiation phase slope of the antenna unit 1*b* is different from the first sub-radiation phase slopes of the antenna unit 1*a* and the antenna unit 1*c*, the second sub-radiation phase slope of the feeder 3*b* may be different from the second sub-radiation phase slopes corresponding to the feeder 3*a* and the feeder 3*c* respectively. Because a length of a feeder affects a second sub-radiation phase slope of the feeder, a length of the feeder 3*b* may be shortened relative to lengths of the feeder 3*a* and the feeder 3*c* based on the structure shown in FIG. 6.

Specifically, in Embodiment 1 of this application, the antenna unit 1*b* is selected as a different type from the antenna unit 1*a* and the antenna unit 1*c*, and a first sub-radiation phase slope of an antenna unit is adjusted, so that the second sub-radiation phase slopes respectively corresponding to the feeder 3*a*, the feeder 3*b*, and the feeder 3*c* can be different. Based on an optimized design, in this embodiment of this application, the first sub-radiation phase slope of the antenna unit 1*b* can achieve a complementary effect with the second sub-radiation phase slope of the feeder 3*b*. In other words, after the antenna unit 1*b* is matched with the feeder 3*b*, the second radiation phase slope of the radiating element is consistent with the first radiation phase slope and the third radiation phase slope, to ensure that the antenna module D performs normal electromagnetic radiation.

Figure 8:
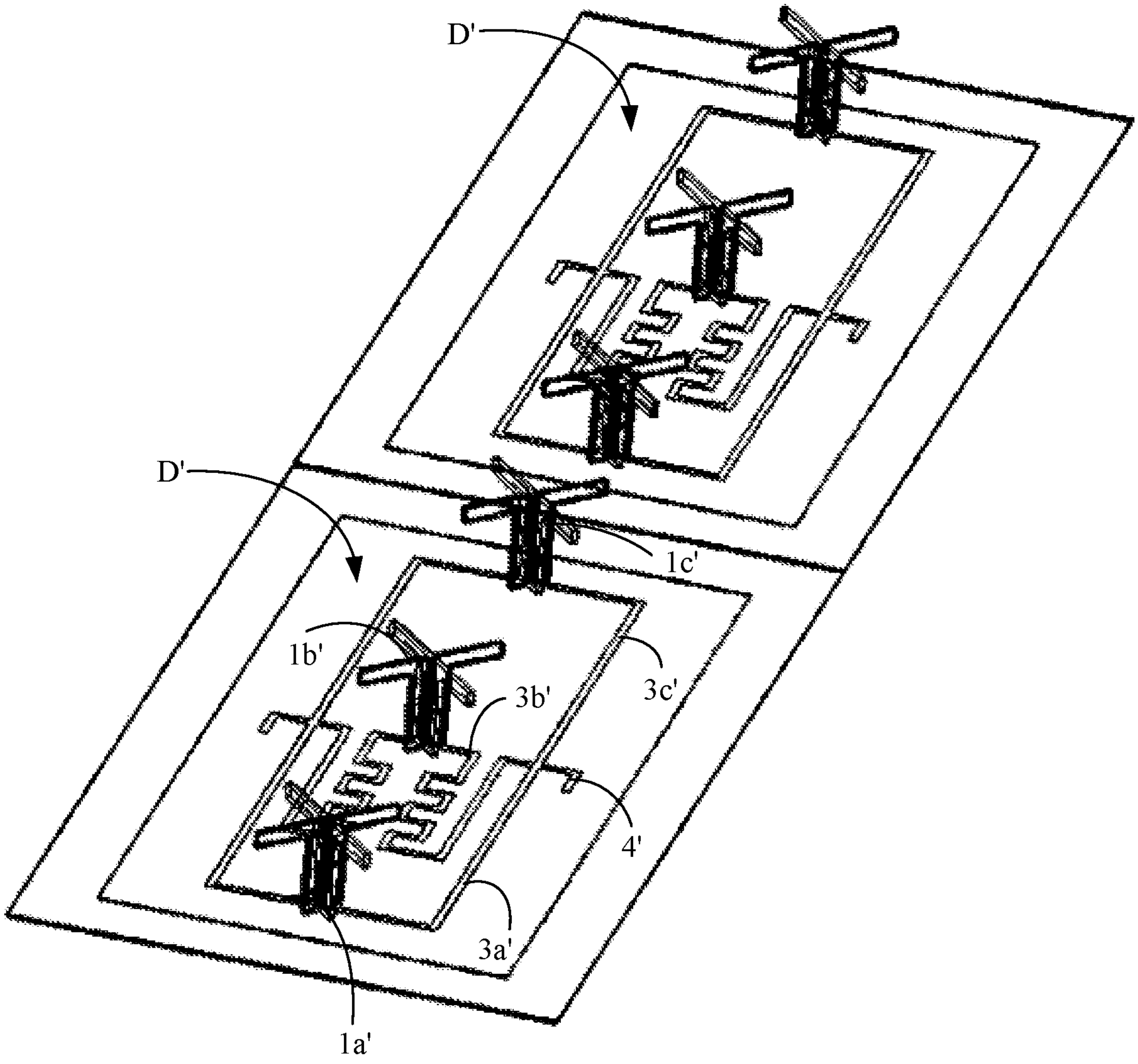
FIG. 8 is a schematic diagram of a structure of an antenna module in a conventional design corresponding to Embodiment 1 of this application.
Figure 9:
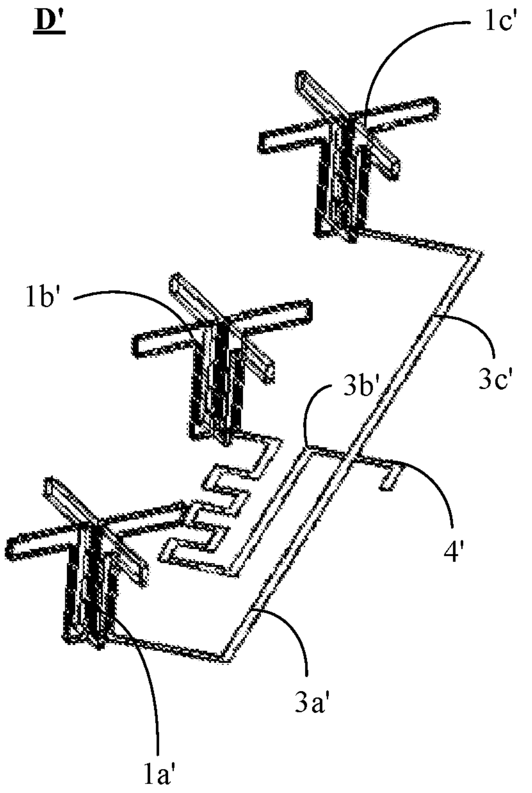
FIG. 9 is a schematic diagram of a structure of single polarization of one antenna module in a structure shown in FIG. 8.

To fully describe differences between Embodiment 1 of this application and the current technology and benefits of Embodiment 1 of this application, FIG. 8 is a schematic diagram of a structure of an antenna module in a conventional design corresponding to various setting conditions in Embodiment 1 of this application. For example, FIG. 9 is a schematic diagram of a structure of single polarization of one antenna module D' in a structure shown in FIG. 8. Refer to FIG. 9 with reference to FIG. 8. The antenna module D' includes an antenna unit 1*a*', an antenna unit 1*b*', and an antenna unit 1*c*', where structures of the antenna unit 1*a*', the antenna unit 1*b*', and the antenna unit 1*c*' are the same. Because the structures of the antenna unit 1*a*', the antenna unit 1*b*', and the antenna unit 1*c*' are the same, first sub-radiation phase slopes of the antenna unit 1*a*', the antenna unit 1*b*', and the antenna unit 1*c*' are the same. As described above, in this embodiment of this application, the first preset value is 0. Therefore, a feeder 3*a*', a feeder 3*b*', and a feeder 3*c*' that are connected to the antenna unit 1*a*', the antenna unit 1*b*', and the antenna unit 1*c*' should also have a same second sub-radiation phase slope. In other words, lengths of the feeder 3*a*', the feeder 3*b*', and the feeder 3*c*' need to be equal.

However, because the antenna unit 1*b*' is close to a feeding port 4', the feeder 3*b*' connected to the antenna unit 1*b*' needs to be complexly wound to meet a limitation condition that the second sub-radiation phase slopes of the feeders are consistent. In the structure shown in FIG. 9, a winding operation of the feeder 3*b*' increases a difficult of a layout of a feed network, and increases design complexity of an antenna module. In addition, because feeder 3*b*' winding is longer, a loss of the feeder 3*b*' increases. Consequently, a loss of a radiating element increases, and radiation efficiency decreases.

Figure 10:
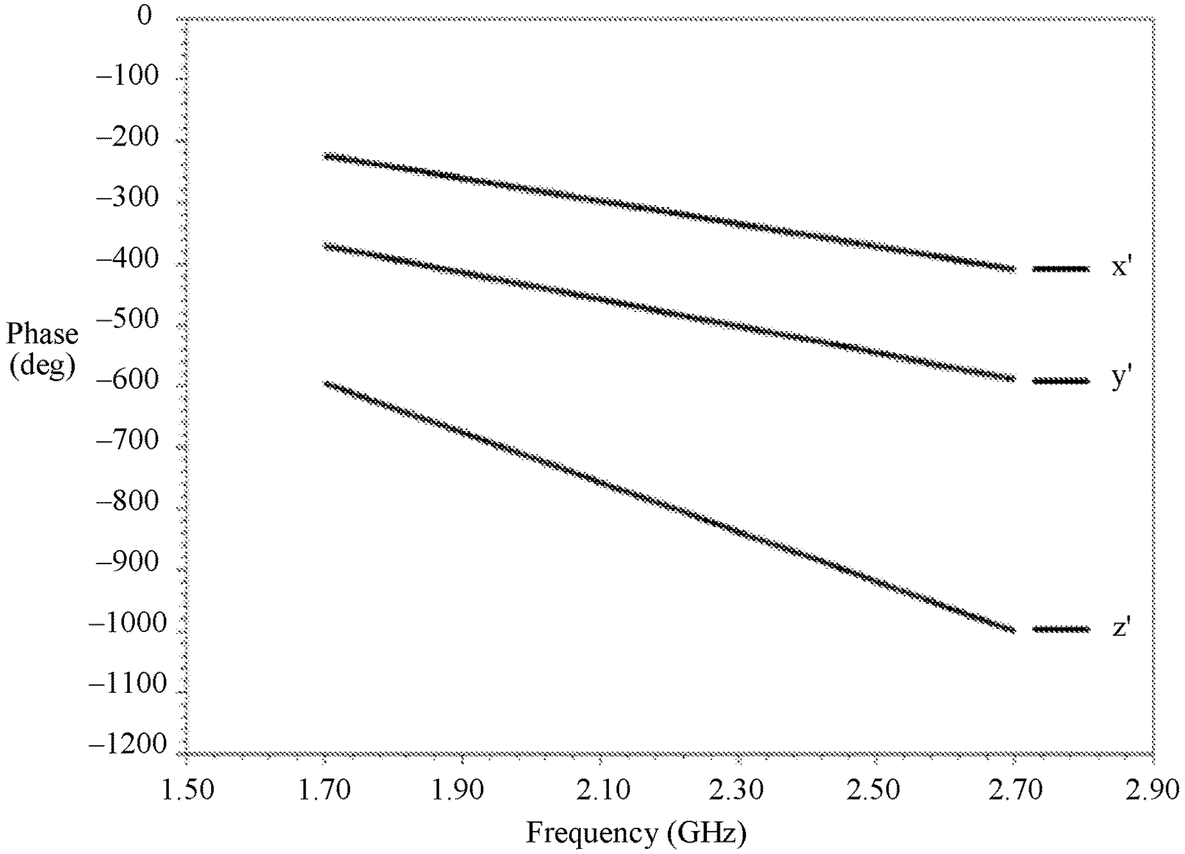
FIG. 10 is a schematic diagram of a phase slope of a conventionally disposed antenna module corresponding to a structure in FIG. 9.

FIG. 10 is a schematic diagram of a phase slope of a conventionally disposed antenna module D' corresponding to FIG. 9. A phase slash x' in FIG. 10 is the first sub-radiation phase slopes of the antenna unit 1*a*', the antenna unit 1*b*', and the antenna unit 1*c*' (the first sub-radiation phase slopes of the three antenna units are coincided). A slash y' is the second sub-radiation phase slopes of the feeder 3*a*', the feeder 3*b*', and the feeder 3*c*' (where lengths of three strips are equal, and slashes are coincided). A slash z' is the radiation phase slopes of the radiating elements finally formed through that the three feeding strips are combined with the three antenna units. The radiation phase slopes of the three radiating elements are also completely coincided. This indicates that the antenna module D' can perform normal radiation without a downtilt angle.

Figure 11:
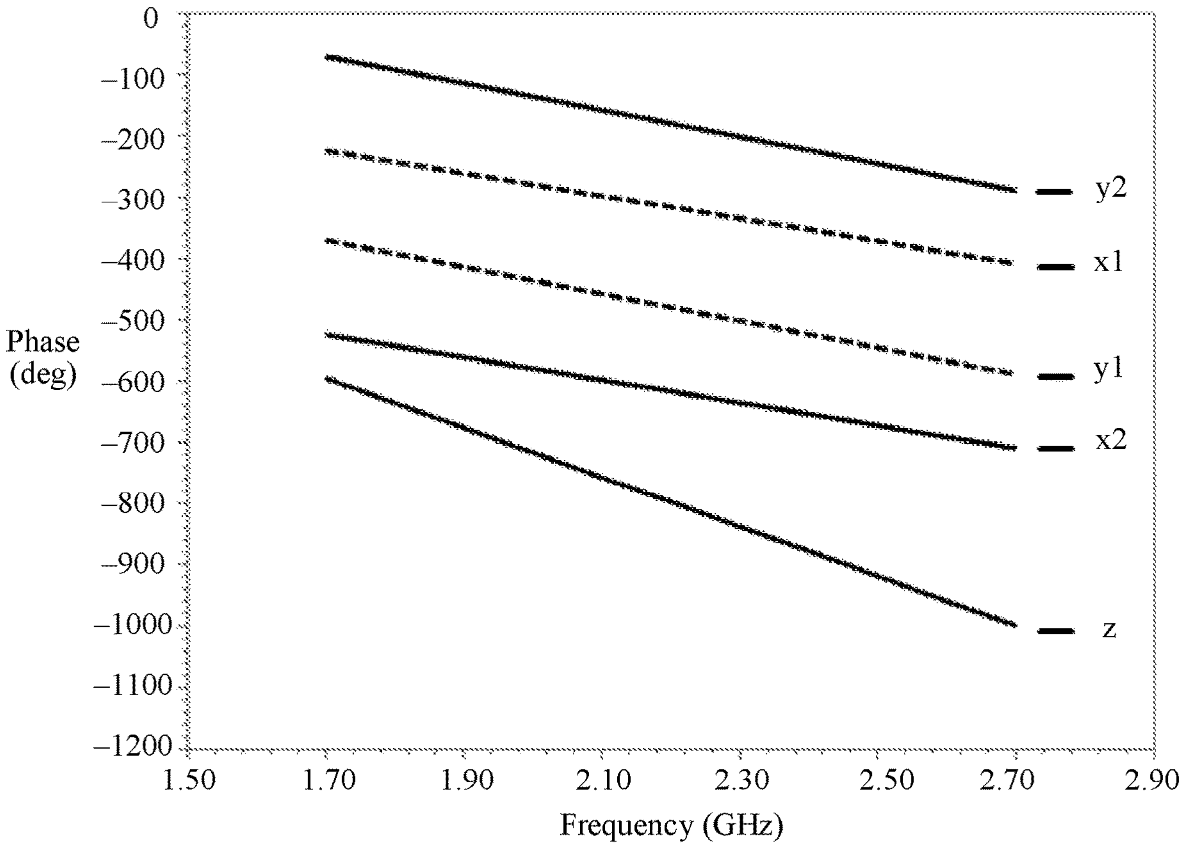
FIG. 11 is a diagram of a phase slope corresponding to an antenna module in Embodiment 1 of this application.

FIG. 11 is a diagram of a phase slope corresponding to an antenna module in Embodiment 1 of this application, that is, a diagram of a phase slope of a structure shown in FIG. 6. A slash x1 is the first sub-radiation phase slopes corresponding to the antenna unit 1*a* and the antenna unit 1*c* (because the antenna unit 1*a* and the antenna unit 1*c* are the same, first sub-radiation phase slope lines of the two are coincided), A slash y1 is the second sub-radiation phase slopes of the feeder 3*a* and the feeder 3*c* (because lengths of the feeder 3*a* and the feeder 3*c* are the same, second sub-radiation phase slope lines of the two are coincided). It should be noted that the slash x1 and the slash y1 are respectively consistent with the slash x' and the slash y' shown in FIG. 10.

Still refer to FIG. 11. A slash x2 is a first sub-radiation phase slope corresponding to the antenna unit 1*b*, and a slash y2 is a second sub-radiation phase slope corresponding to the feeder 3*b*. It can be learned from FIG. 11 that the slash x2 is below the slash x1, indicating that the antenna unit 1*b* has a much lower radiation phase than the antenna unit 1*a* and the antenna unit 1*c*. To compensate for a phase lag of the antenna unit 1*b*, the feeder 3*b* needs to be shortened, to enable a phase of the feeder 3*b* to be advanced compared to the feeder 3*a* and the feeder 3*c*, that is, the slash y2 is above the slash y1. Based on a reasonable optimization design, a second radiation phase slope of a radiating element formed after the antenna unit 1*b* is matched with the feeder 3*b* is consistent with a first radiation phase slope and a third radiation phase slope, that is, the three slopes coincide to form a slash z. In this way, normal radiation of the antenna module D is ensured.

It can be further learnt from the foregoing analysis that, the feeder 3*b* in Embodiment 1 of this application is simplified and shortened. Based on this, a cabling layout design of a 1-to-3 module in an entire base station antenna 01 may be greatly simplified, and a loss of a feed network is reduced. In addition, good radiation characteristics of the antenna module D are not affected.

Figure 12:
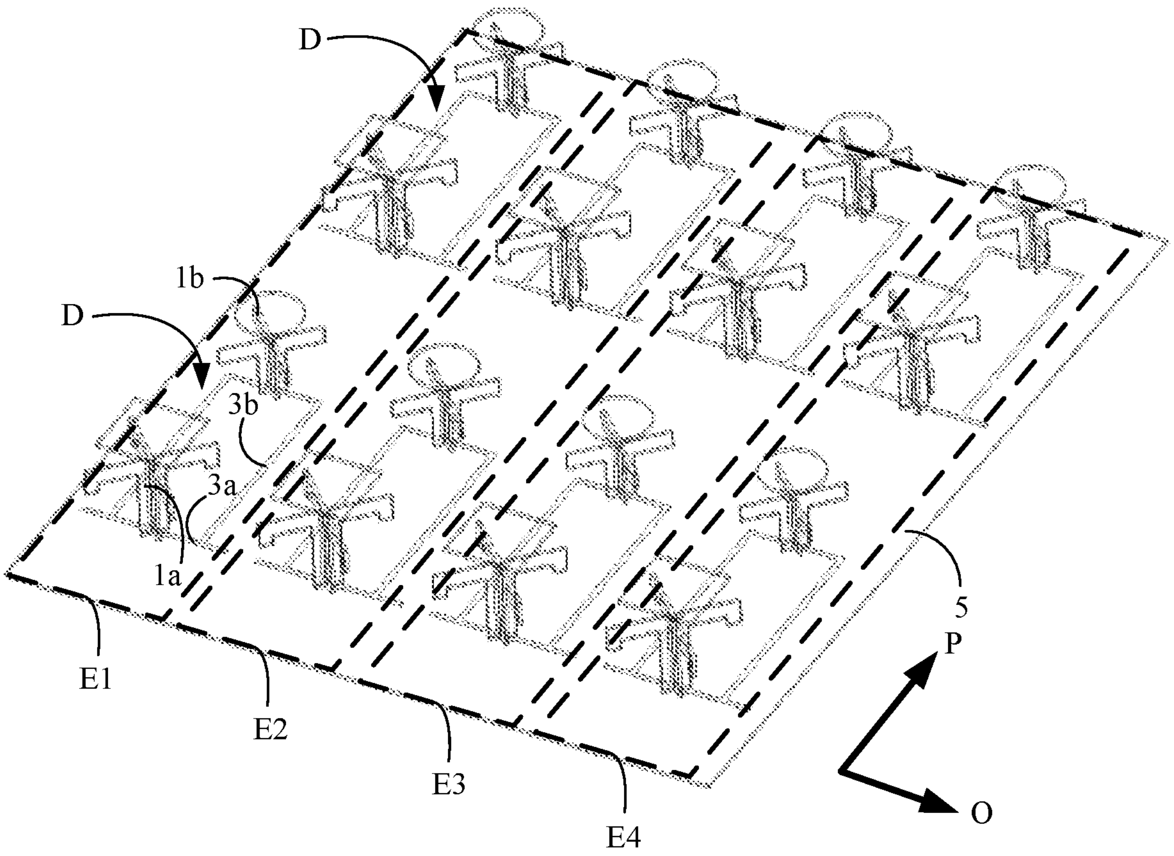
FIG. 12 is a diagram of a structure of a base station antenna according to Embodiment 2 of this application.

FIG. 12 is a diagram of a structure of a base station antenna 01 according to Embodiment 2 of this application. In the structure shown in FIG. 12, two same antenna modules D form one array unit E1 along a direction P. For example, each antenna module D is a 1-to-2 module. In addition, along a direction θ, the array unit E1, an array unit E2, an array unit E3, and an array unit E4 that are the same form one antenna array. It should be understood that Embodiment 2 is an antenna planar array, and the antenna planar array may be used in a MIMO (multiple-input multiple-output, multiple-input multiple-output) antenna system.

One antenna module D in the antenna array E1 shown in FIG. 12 is used as an example for specific description. Each antenna module D includes an antenna unit 1*a* and an antenna unit 1*b*. The antenna unit 1*a* is connected to a feeder 3*a*. The antenna unit 1*b* is connected to a feeder 3*b*. Compared with the structure in Embodiment 1 shown in FIG. 5, a dielectric substrate 2 is not disposed in Embodiment 2. In addition, a reflection plate 5 is disposed on a side that is of the antenna module D and that is away from a radiation direction of the antenna unit 1*a* and the antenna unit 1*b*. It should be understood that the dielectric substrate 2 may alternatively be disposed in Embodiment 2. Herein, only an example in which the dielectric substrate 2 is not disposed is shown, and details are not described herein again.

It should be noted that, because Embodiment 2 shows that the dielectric substrate 2 is not disposed, a gap is needed between the antenna unit 1*a* and the reflection plate 5, and for example, a value of the gap may be 1 mm. Certainly, the value of the gap may be adjusted based on a design requirement, and details are not described herein again. Similarly, a gap is also needed between the antenna unit 1*b* and the reflection plate 5, and for example, a value of the gap may be 1 mm. Moreover, the value of the gap may be adjusted based on a design requirement, and details are not described herein again.

Figure 13:
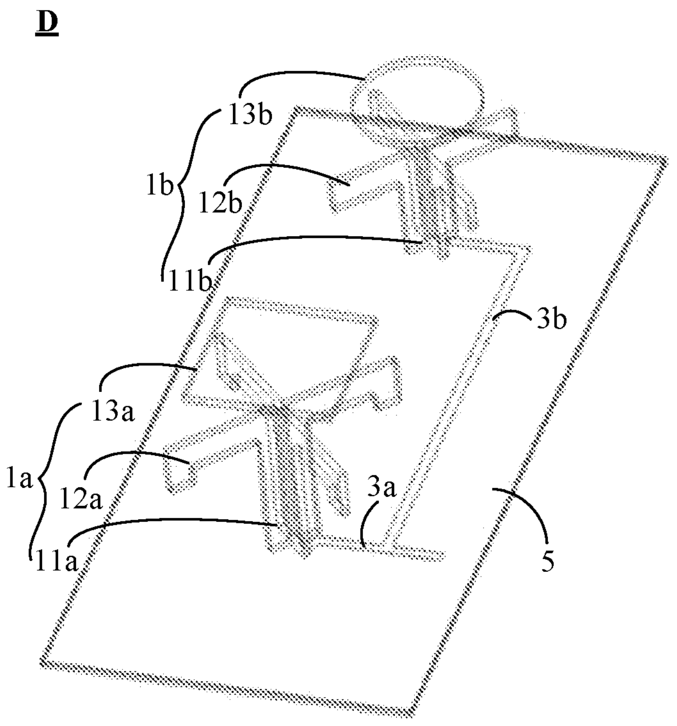
FIG. 13 is a schematic diagram of a structure of single polarization of one antenna module in a structure shown in FIG. 12.

FIG. 13 is an enlarged schematic diagram of a structure in FIG. 12. Specifically, FIG. 13 shows only a single polar feed network of the antenna module D. In the structure shown in FIG. 13, the antenna unit 1*a* and the antenna unit 1*b* are antenna units of a same type, for example, in a cross-dipole form. However, specific structures of the antenna unit 1*a* and the antenna unit 1*b* are different. Specifically, a main part 11*a* of the antenna unit 1*a* is the same as a main part 11*b* of the antenna unit 1*b*. However, a radiation arm 12*a* of the antenna unit 1*a* and a radiation arm 12*b* of the antenna unit 1*b* are different in shape, size, and height. In addition, structures and shapes of a director plate 13*a* of the antenna unit 1*a* and a director plate 13*b* of the antenna unit 1*b* are also different. Because there is a difference between the antenna unit 1*a* and the antenna unit 1*b*, a first sub-radiation phase slope of the antenna unit 1*a* is different from a first sub-radiation phase slope of the antenna unit 1*b*.

In Embodiment 2 of this application, the antenna unit 1*a* and the feeder 3*a* form one radiating element, and the radiating element has a first radiation phase slope. The antenna unit 1*b* and the feeder 3*b* form one radiating element, and the radiating element has a second radiation phase slope. In addition, in Embodiment 2, it is set that a difference between the first radiation phase slope and the second radiation phase slope is not 0, that is, a first preset value is greater than 0. In other words, compared with the technical solution in Embodiment 1 of this application, phases of the antenna unit 1*a* and the antenna unit 1*b* in Embodiment 2 of this application are preset to fixed tilt angles.

On a premise that the difference between the first radiation phase slope and the second radiation phase slope is met, because first sub-radiation phase slopes of the antenna unit 1*a* and the antenna unit 1*b* shown in FIG. 13 are different, a second sub-radiation phase slope of the feeder 3*a* may be different from a second sub-radiation phase slope of the feeder 3*b*. Because a length of a feeder affects a second sub-radiation phase slope of the feeder, a length of the feeder 3*a* may be shortened relative to a length of the feeder 3*b* based on the structure shown in FIG. 13.

Figure 14:
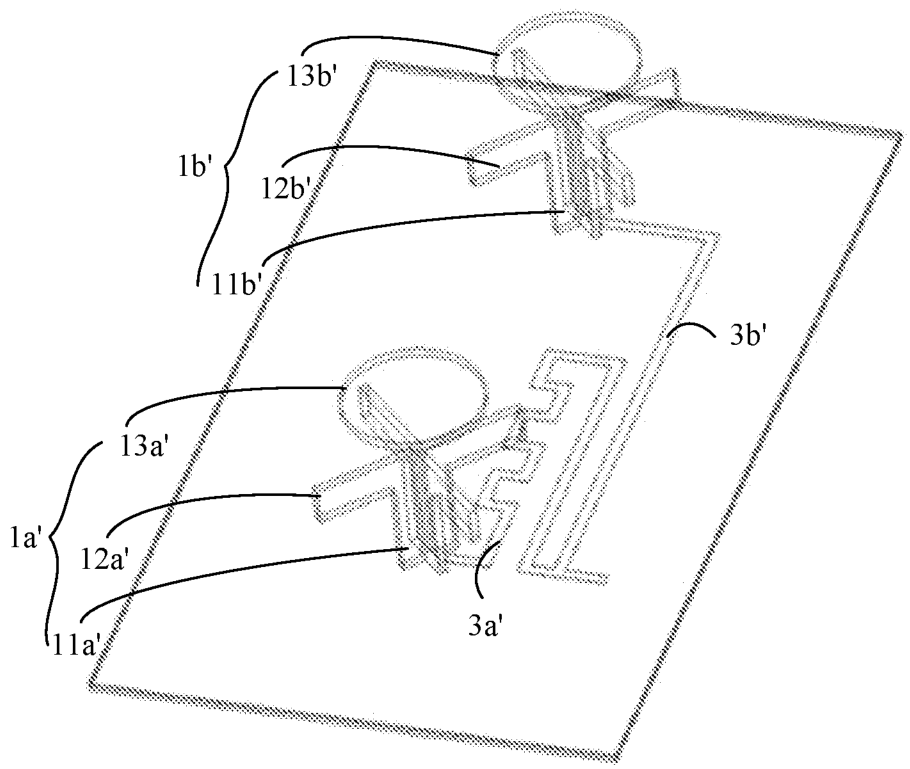
FIG. 14 is a schematic diagram of a structure of a conventionally disposed antenna module corresponding to a structure in FIG. 13.

To fully describe differences between Embodiment 2 of this application and the current technology and benefits of Embodiment 2 of this application, FIG. 14 shows a conventional design manner corresponding to Embodiment 2. In a conventional design, a main part 11*a*', a radiation arm 12*a*', and a director plate 13*a*' of an antenna unit 1*a*' are identical to a main part 11*b*', a radiation arm 12*b*', and a director plate 13*b*' of an antenna unit 1*b*'. First sub-radiation phase slopes of the antenna unit 1*a*' and the antenna unit 1*b*' are consistent. Because the antenna unit 1*a*' and the antenna unit 1*b*' are at different positions from a main feeding port, a length of a feeder 3*b*' is longer. To meet a phase requirement of a fixed tilt angle, a feeder 3*a*' needs to be specifically wound to ensure a relative relationship with the feeder 3*b*'. This leads to difficulties in a layout of a feed network and an increased loss.

Compared with the structure shown in FIG. 14, the feeder 3*a* in Embodiment 2 of this application is simplified and shortened. Based on this, a cabling layout design of an entire 1-to-2 module can be greatly simplified, and a loss of the feed network is reduced. In addition, good radiation characteristics of the antenna module D are not affected.

Figure 15:
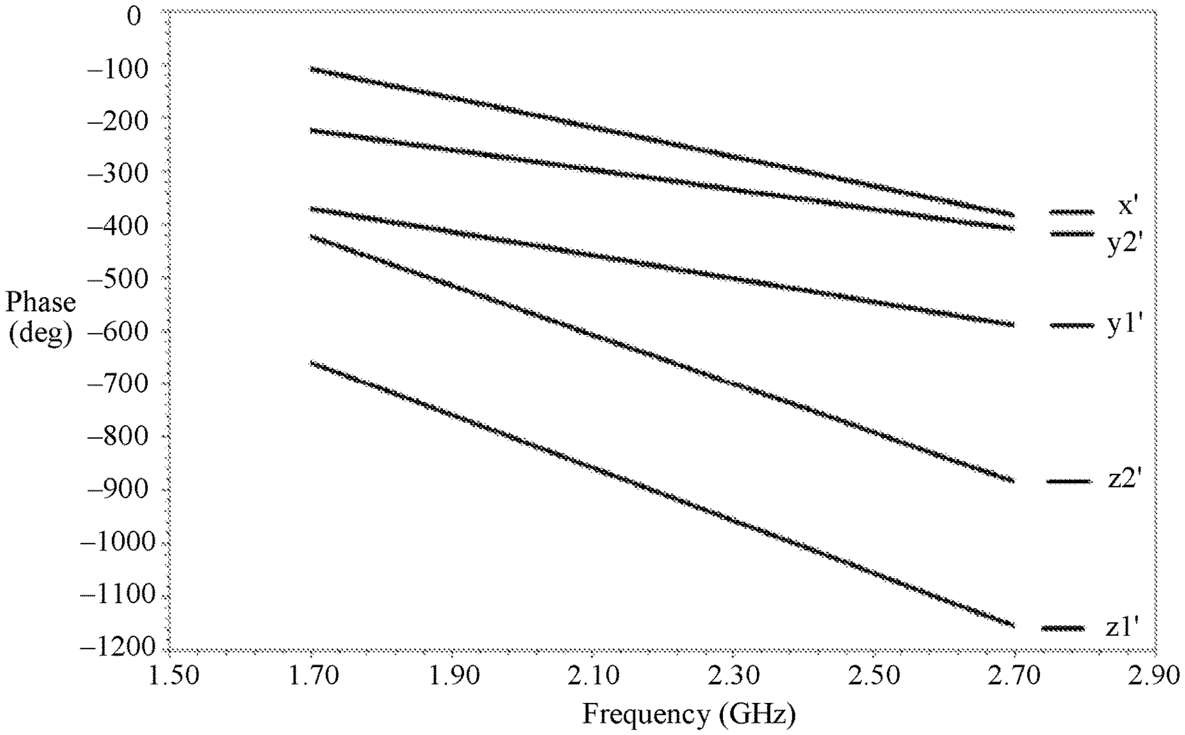
FIG. 15 is a schematic diagram of a phase slope of a conventionally disposed antenna module corresponding to a structure in FIG. 14.

FIG. 15 is a schematic diagram of a phase slope corresponding to a conventionally disposed antenna module D' in the current technology in FIG. 14. A slash x' is the first sub-radiation phase slopes of the antenna unit 1*a*' and the antenna unit 1*b*' (because the antenna unit 1*a*' and the antenna unit 1*b*' are the same, first sub-radiation phase slope lines of the two are coincided). A slash y1' is a second sub-radiation phase slope of the feeder 3*a*', and a slash y2' is a second sub-radiation phase slope of the feeder 3*b*'. A slash z1' is a first radiation phase slope of a radiating element finally formed by the antenna unit 1*a*' and the feeder 3*a*'. A slash z2' is a second radiation phase slope of a radiating element finally formed by the antenna unit 1*b*' and the feeder 3*b*'. Because the first preset value is not 0, a phase of the antenna unit 1*a* and the phase of the antenna unit 1*b* in Embodiment 2 of this application is preset to the fixed tilt angle. Therefore, the slash z1' and the slash z2' are not coincided.

It should be noted that a phase difference between the slash z1' and the slash z2' is consistent with a phase difference between the slash y1' and the slash y2'. A total phase difference makes a final radiation beam have a specific tilt angle.

Figure 16:
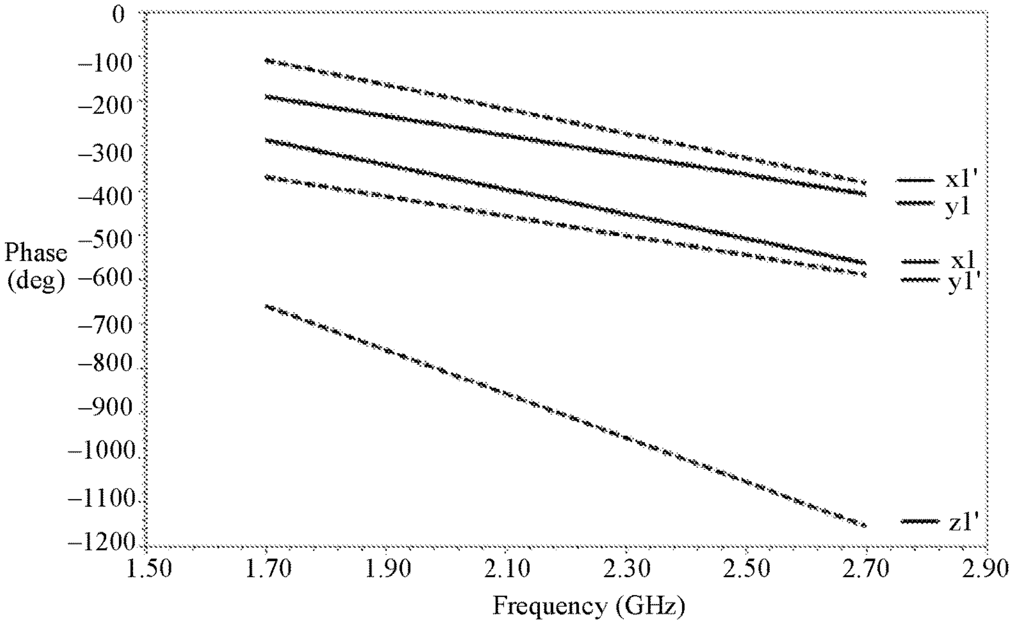
FIG. 16 is a diagram of a phase slope corresponding to an antenna module in Embodiment 1 of this application.

FIG. 16 is a diagram of a phase slope corresponding to an antenna module in Embodiment 1 of this application. In FIG. 16, a slash x1' is a first sub-radiation phase slope of the antenna unit 1*a*' in the current technology, and a slash y1' is a second sub-radiation phase slope corresponding to the feeder 3*a*'. It should be noted that the slash x1' is consistent with the slash x' in FIG. 15, and the slash y1' is consistent with the slash y1' in FIG. 15. A slash x1 shown in FIG. 16 is a first sub-radiation phase slope corresponding to the antenna unit 1*a* in Embodiment 1 of this application, and a slash y1 is a second sub-radiation phase slope corresponding to the feeder 3*a* in Embodiment 1 of this application. It can be learned that a radiation phase of the antenna unit 1*a* is clearly lagged behind that of the antenna unit 1*a*'. To achieve a same radiation effect as that of a conventional design, a phase of the feeder 3*a* is advanced compared with that of the feeder 3*a*'. To be specific, the feeder 3*a* needs to be shortened, to ensure that a radiation phase slope of a radiating element formed after the antenna unit 1*a* is matched with the feeder 3*a* is consistent with a radiation phase slope of a radiating element formed after the antenna unit 1*a*' is matched with the feeder 3*a*', that is, an effect of the slash z1'. In this way, the antenna module D may finally perform radiation based on the preset fixed tilt angle.

Compared with the structure shown in FIG. 15, the feeder 3*a* in Embodiment 2 of this application is simplified and shortened. Based on this, a cabling layout design of the entire 1-to-2 module can be greatly simplified, and a loss of the feed network is reduced. In addition, good radiation characteristics of the antenna module D are not affected.

Certainly, it may merely set that the radiation arm 12*a* of the antenna unit 1*a* in the antenna module D in FIG. 13 may be different from the radiation arm 12*b* of the antenna unit 1*b*. Alternatively, it may set that the director plate 13*a* of the antenna unit 1*a* is different from the director plate 13*b* of the antenna unit 1*b*. Compared with the structure in Embodiment 2 of this application, only a director plate or a radiation arm is changed in this structure. Therefore, details are not described herein again.

Figure 17:
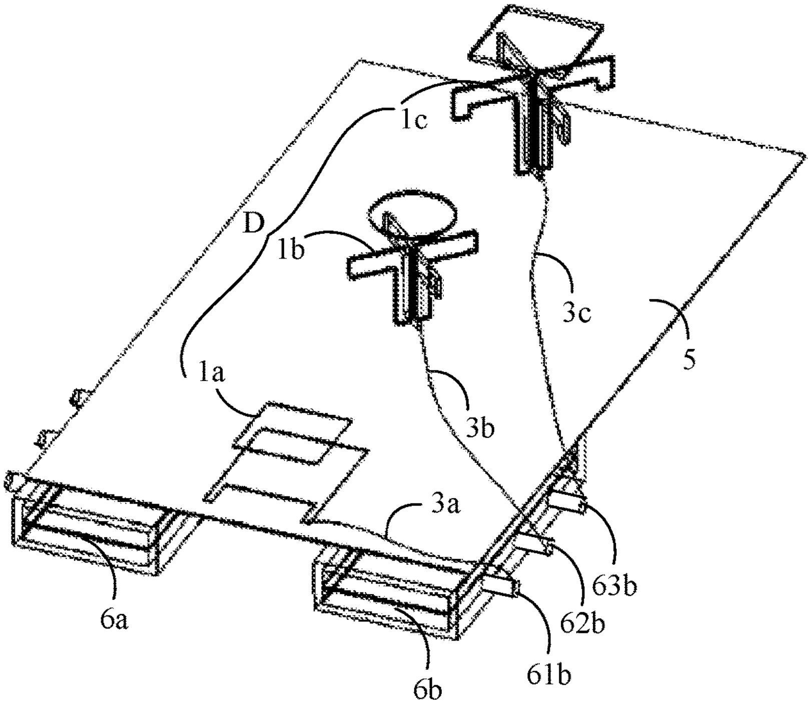
FIG. 17 is a diagram of a structure of a base station antenna according to Embodiment 3 of this application.

FIG. 17 is a diagram of a structure of a base station antenna 01 in FIG. 1 according to Embodiment 3 of this application. For the structure shown in FIG. 17, a difference between Embodiment 3 of this application and Embodiment 1 of this application is that only one antenna module D is included in Embodiment 3. For example, the antenna module D includes an antenna unit 1*a*, an antenna unit 1*b*, and an antenna unit 1*c*. It should be understood that the antenna module D is not limited to including only the foregoing three antenna units, and description is merely used as an example herein. In addition, in Embodiment 3 of this application, a phase shifter 6*a* and a phase shifter 6*b* serve as a feed mechanism to feed two poles of the foregoing three antenna units. Only a schematic diagram is used herein to illustrate a feed structure of the phase shifter 6*b*.

Still refer to FIG. 17. The antenna unit 1*a*, the antenna unit 1*b*, and the antenna unit 1*c* are located on a front side of a reflection plate 5, and the phase shifter 6*a* and the phase shifter 6*b* are located on a back side of the reflection plate 5. It should be understood that the "front side" herein refers to a side that is of the reflection plate 5 and that faces a radiation direction of the antenna module D, and the "back side" refers to a side that is of the reflection plate 5 and that is away from the radiation direction of the antenna module D.

Specifically, types of the antenna unit 1*b* and the antenna unit 1*c* are the same, but shapes and sizes of radiation arms and director plates of the antenna unit 1*b* and the antenna unit 1*c* may be different. Types of the antenna unit 1*a*, the antenna unit 1*b*, and the antenna unit 1*c* are different, which finally indicates that the three antenna units have different first sub-radiation phase slopes. The phase shifter 6*b* has an output port 61*b*, an output port 62*b*, and an output port 63*b*, where the output port 61*b* is connected to the antenna unit 1*a* through a feeder 3*a*, the output port 62*b* is electrically connected to the antenna unit 1*b* through a feeder 3*b*, and the output port 63*b* is connected to the antenna unit 1*c* through a feeder 3*c*. The output port 61*b*, the output port 62*b*, and the output port 63*b* feed a same polarization of the three antenna units. The feeder 3*a*, the feeder 3*b*, and the feeder 3*c* are coaxial feeders.

It should be understood that the antenna unit 1*a* and the feeder 3*a* form one radiating element, the antenna unit 1*b* and the feeder 3*b* form one radiating element, and the antenna unit 1*c* and the feeder 3*c* form one radiating element. When the feed mechanism is the phase shifter 6*b*, an output phase of the phase shifter 6*b* may change as required. This means that radiating elements in the antenna module D may implement, in a radiation manner described in Embodiment 1 of this application, equal-phase tilt-angle-free radiation (to be specific, a first preset value is 0). Alternatively, different-phase specific-tilt-angle radiation may be implemented in a radiation manner described in Embodiment 2 of this application (to be specific, the first preset value is greater than 0). For example, a range of setting a downtilt angle (that is, the first preset value) is 0 degrees to 12 degrees. When the antenna module D has a downtilt angle of 0 degrees, three radiating elements in the antenna module D need to have a same radiation phase slope.

In a conventional design method, three same antenna units are used, and feeders connected to each antenna unit have a same length. However, in Embodiment 3 of this application, the antenna unit 1*a*, the antenna unit 1*b*, and the antenna unit 1*c* have different first sub-radiation phase slopes. When radiation phase slopes of all the radiating elements are the same, the feeder 3*a*, the feeder 3*b*, and the feeder 3*c* may have different second sub-radiation phase slopes. Based on this, in Embodiment 3 of this application, the feeder 3*a*, the feeder 3*b*, and the feeder 3*c* respectively corresponding to relative positions between the antenna unit 1*a* and the phase shifter 6*b*, the antenna unit 1*b* and the phase shifter 6*b*, and the antenna unit 1*c* and the phase shifter 6*b*, may be optimized based on the relative positions. Finally, a cabling layout of a feed network is simplified and a loss of the antenna module D is reduced while normal radiation is ensured.

Figure 18:
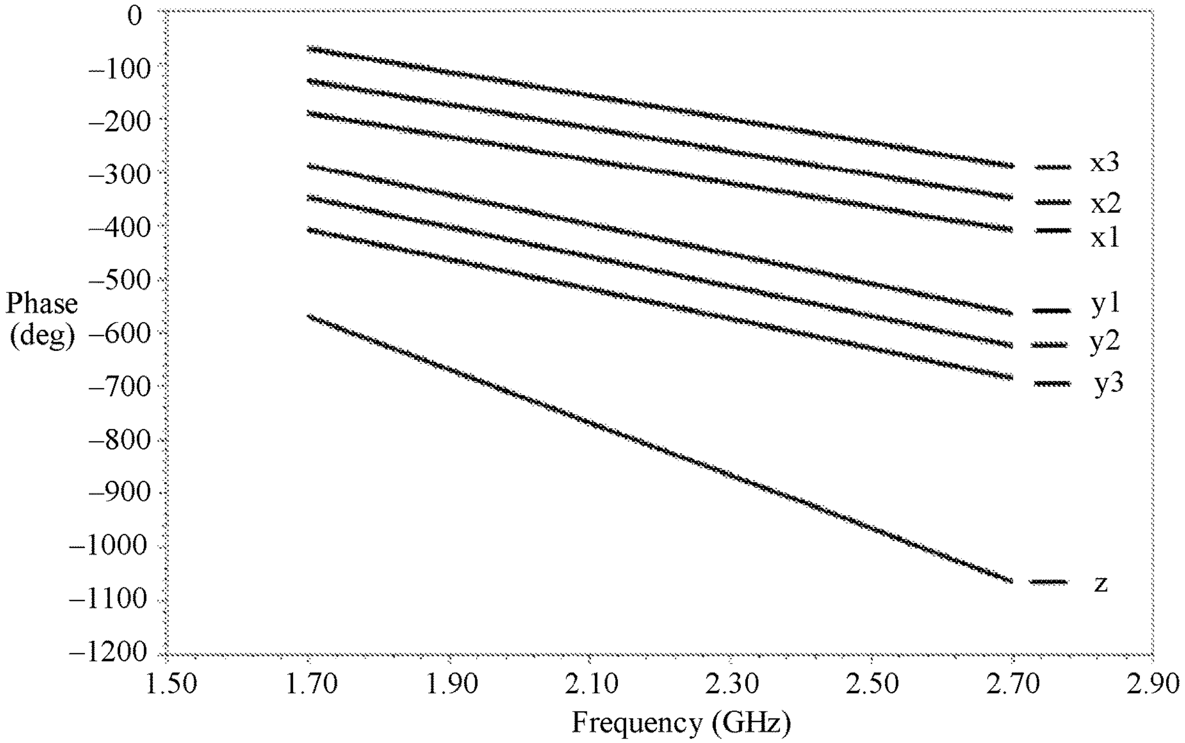
FIG. 18 is a diagram of a phase slope corresponding to an antenna module in Embodiment 3 of this application.

FIG. 18 is a diagram of a phase slope corresponding to the structure in FIG. 17. Slashes x1, x2, and x3 are respectively first sub-radiation phase slopes corresponding to the antenna unit 1*a*, the antenna unit 1*b*, and the antenna unit 1*c*. Slashes y1, y2, and y3 are respectively second sub-radiation phase slopes of the feeder 3*a*, the feeder 3*b*, and the feeder 3*c*. In Embodiment 3, a downtilt angle of the antenna module D starts from 0 degrees. Therefore, when the angle is 0 degrees, to be specific, the antenna module D has no downtilt, it is necessary to supplement a difference between the first sub-radiation phase slopes of the antenna unit 1*a*, the antenna unit 1*b*, and the antenna unit 1*c*. It can be learned from FIG. 18 that linear relationships between the slash x1 and slash y1, slash x2 and slash y2, and slash x3, and slash y3 are opposite. A phase slash z may also be obtained after two-two combination of the slash x1 and the slash y1, the slash x2 and the slash y2, and the slash x3 and the slash y3. That is, three antenna units with different first sub-radiation phase slopes are matched with three feeders with different second sub-radiation phase slopes, so that the radiating elements inside the antenna module D can have same radiation phase slopes when the antenna module D is tilted down at 0 degrees. After phase relationships are supplemented at 0 degrees, when the phase shifter 6*b* tilts down, the antenna module D may perform normal downtilt radiation.

Figure 19:
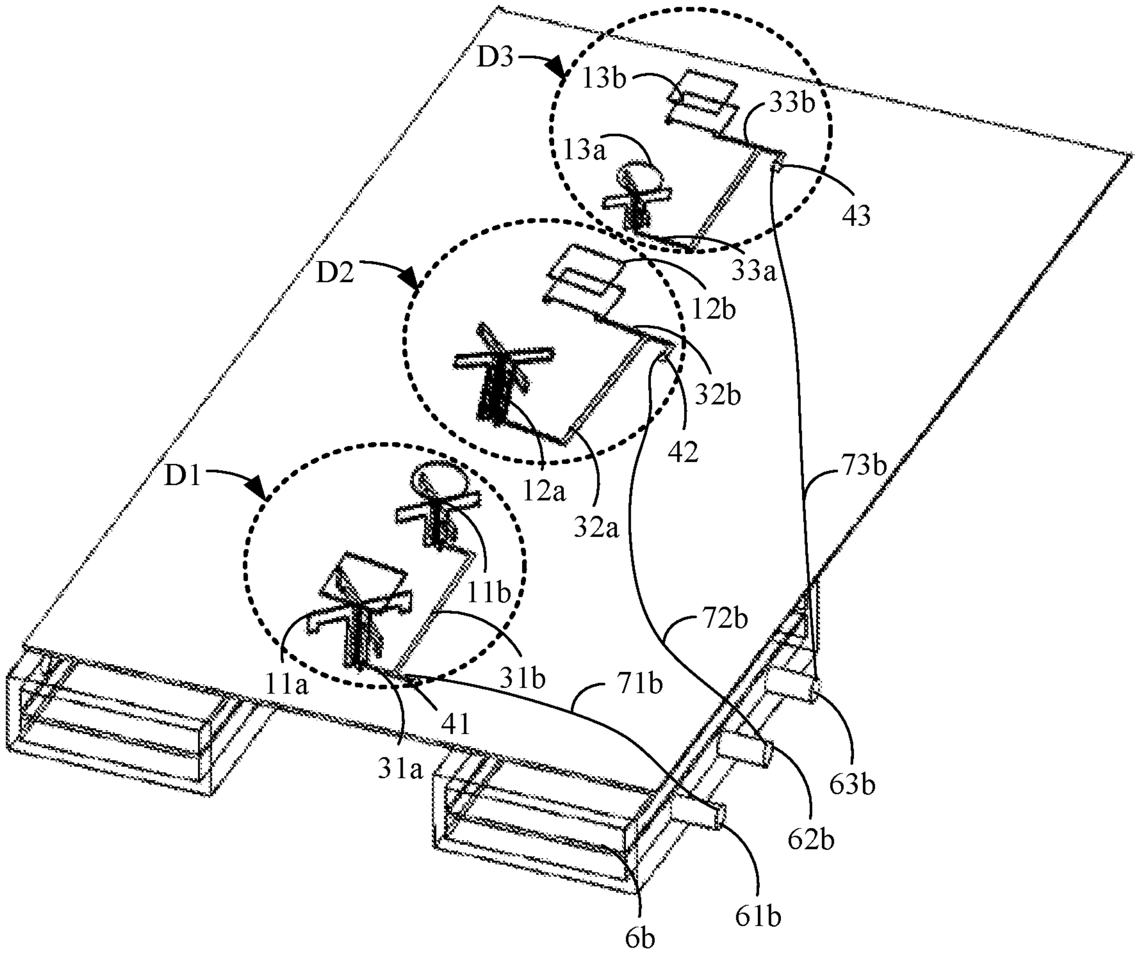
FIG. 19 is a diagram of a structure of a base station antenna according to Embodiment 4 of this application.

FIG. 19 is a diagram of a structure of a base station antenna 01 in FIG. 1 according to Embodiment 4 of this application. Compared with the structure shown in FIG. 19, the structure shown in Embodiment 4 of this application has the following differences from the structure shown in Embodiment 3 of this application in FIG. 17. In Embodiment 4 of this application, there are three antenna modules: an antenna module D1, an antenna module D2, and an antenna module D3, where the antenna module D1 includes an antenna unit 11*a* and an antenna unit 11*b*. The antenna unit 11*a* is connected to a feeding port 41 through a feeder 31*a*, and the antenna unit 11*b* is connected to the feeding port 41 through a feeder 31*b*. In addition, the feeding port 41 is connected to an output port 61*b* of a phase shifter 6*b* through a connection cable 71*b*. The antenna module D2 includes an antenna unit 12*a* and an antenna unit 12*b*. The antenna unit 12*a* is connected to a feeding port 42 through a feeder 32*a*, and the antenna unit 12*b* is connected to the feeding port 42 through a feeder 32*b*. In addition, the feeding port 42 is connected to an output port 62*b* of the phase shifter 6*b* through a connection cable 72*b*. The antenna module D3 includes an antenna unit 13*a* and an antenna unit 13*b*. The antenna unit 13*a* is connected to a feeding port 43 through a feeder 33*a*, and the antenna unit 13*b* is connected to the feeding port 43 through the feeder 33*b*. In addition, the feeding port 43 is connected to an output port 63*b* of the phase shifter 6*b* through a connection cable 73*b*. It should be understood that the connection cable 71*b*, the connection cable 72*b*, and the connection cable 73*b* are also cables in a feed network, and are named connection cables herein to distinguish from feeders.

Specifically, the antenna unit 11*a* and the feeder 31*a* form one radiating element, and the radiating element has a first radiation phase slope. The antenna unit 11*b* and the feeder 31*b* form one radiating element, and the radiating element has a second radiation phase slope. The antenna module D1 has a first module radiation phase slope, where the first module radiation phase slope is equal to a sum of a first radiation phase slope and a second radiation phase slope. Similarly, the antenna module D2 has a second module radiation phase slope, and the antenna module D3 has a third module radiation phase slope.

In an antenna module and a connection cable in pairs that are in a one-to-one correspondence, a sum of a module radiation phase slope of the antenna module and a third sub-radiation phase slope of the connection cable forms a total radiation phase slope. Specifically, the first module phase slope of the antenna module D1 and a third sub-radiation phase slope of the connection cable 71*b* are a first total radiation phase slope. The second module phase slope of the antenna module D2 and a third sub-radiation phase slope of the connection cable 72*b* are a second total radiation phase slope. The third module phase slope of the antenna module D3 and a third sub-radiation phase slope of the connection cable 73*b* are a third total radiation phase slope. It should be understood that when a difference between the first total radiation phase slope, the second total radiation phase slope, and the third total radiation phase slope meets a second preset value that is 0, there is no downtilt angle between the antenna modules; and when the second preset value is greater than 0, there is a downtilt angle between the antenna modules.

It should be noted that, on a premise that the second preset value is met, module radiation phase slopes of the antenna modules may be adjusted, so that third radiation phase slopes of the connection cables are different, to adjust lengths of the connection cables between feeding ports and output ports of a phase shifter. Specifically, lengths of the corresponding connection cable 71*b*, the connection cable 72*b*, and the connection cable 73*b* may be optimized based on distances from relative positions to the phase shifter 6*b*, so that a cable layout of the feed network can be simplified and a loss of an antenna can be reduced while normal radiation of an antenna is ensured.

The antenna module D1 is used as an example. When the module radiation phase slopes of the antenna modules are adjusted, the first sub-radiation phase slope may be changed by adjusting structures of the antenna unit 11*a* and the antenna unit 11*b*. Alternatively, the second sub-radiation phase slope may be changed by adjusting lengths of the feeder 31*a* and the feeder 31*b*, so that the first radiation phase slope and the second radiation phase slope are changed, to change a module radiation phase slope of the antenna module D1.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A base station antenna, comprising a feed mechanism and at least one antenna module, wherein each antenna module comprises at least two antenna units, and each antenna unit has a first sub-radiation phase slope; and in each antenna module:

first sub-radiation phase slopes of the at least two antenna units are different, and each antenna unit is connected to the feed mechanism through a corresponding feeder that is in a one-to-one correspondence with the antenna unit, wherein the corresponding feeder has a second sub-radiation phase slope;

the antenna unit and the corresponding feeder form one radiating element, and a radiation phase slope of each radiating element is a sum of the first sub-radiation phase slope of the antenna unit and the second sub-radiation phase slope of the corresponding feeder.

2. The base station antenna according to claim 1, wherein each antenna module comprises three or more antenna units, and radiating elements in each antenna module has a same radiation phase slope.

3. The base station antenna according to claim 1, wherein each antenna module comprises at least two types of antenna units.

4. The base station antenna according to claim 1, wherein antenna units comprised in each antenna module are of a same type, wherein each antenna unit comprises a main part, a director plate, and a radiation arm; and the main parts of the antenna units comprised in each antenna module are a same type, and at least one of the director plates or the radiation arms of the antenna units comprised in each antenna module are different types.

5. The base station antenna according to claim 1, wherein the feed mechanism comprises a feeding port, and each antenna unit in the antenna module is connected to the feeding port through the corresponding feeder.

6. The base station antenna according to claim 5, further comprising a dielectric substrate, wherein the dielectric substrate has a first surface and a second surface, the feeding port is disposed on the first surface, and a signal ground is disposed on the second surface; and the antenna module is disposed on the dielectric substrate, and the antenna unit is connected to the signal ground.

7. The base station antenna according to claim 1, wherein the feed mechanism comprises a plurality of feeding ports, a phase shifter, and a plurality of connection cables, and the antenna units in each antenna module is connected to a feeding port of the plurality of feeding ports through the corresponding feeders;

the phase shifter is provided with a plurality of output ports, a feeding port connected to each antenna module is connected to one corresponding output port through a corresponding connection cable that is in a one-to-one correspondence with the feeding port; each connection cable has a third sub-radiation phase slope;

for each the antenna module and the corresponding connection cable that are in a one-to-one correspondence, a sum of the radiation phase slopes of the radiating elements in the antenna module forms a module radiation phase slope; and a sum of the module radiation phase slope and the third sub-radiation phase slope forms a total radiation phase slope.

8. The base station antenna according to claim 1, wherein the feed mechanism comprises a phase shifter, and the phase shifter is provided with a plurality of output ports; and the antenna unit in the antenna module is connected to an output port through the corresponding feeder, and the antenna units in the antenna module are connected to different output ports.

9. The base station antenna according to claim 1, further comprising a reflection plate, wherein the reflection plate is located on a side of the antenna unit away from a radiation direction of the antenna unit.

10. The base station antenna according to claim 1, wherein in each antenna module, a phase difference on a center frequency between the antenna units that have different first sub-radiation phase slopes is greater than or equal to 180°.

11. The base station antenna according to claim 1, wherein the antenna unit is a ±45° dual-polarized antenna.

12. A base station, comprising a base station antenna, wherein the base station antenna comprises a feed mechanism and at least one antenna module, wherein each antenna module comprises at least two antenna units, and each antenna unit has a first sub-radiation phase slope; and in each antenna module:

first sub-radiation phase slopes of the at least two antenna units are different, and each antenna unit is connected to the feed mechanism through a corresponding feeder that is in a one-to-one correspondence with the antenna unit, wherein the corresponding feeder has a second sub-radiation phase slope;

the antenna unit and the corresponding feeder form one radiating element, and a radiation phase slope of each radiating element is a sum of the first sub-radiation phase slope of the antenna unit and the second sub-radiation phase slope of the corresponding feeder.

13. The base station according to claim 12, wherein each antenna module comprises three or more antenna units, and radiating elements in each antenna module has a same radiation phase slope.

14. The base station according to claim 12, wherein each antenna module comprises at least two types of antenna units.

15. The base station according to claim 12, wherein antenna units comprised in each antenna module are of a same type, wherein each antenna unit comprises a main part, a director plate, and a radiation arm; and the main parts of the antenna units comprised in each antenna module are a same type, and at least one of the director plates or the radiation arms of the antenna units comprised in each antenna module are different types.

16. The base station according to claim 12, wherein the feed mechanism comprises a feeding port, and each antenna unit in the antenna module is connected to the feeding port through the corresponding feeder.

17. The base station according to claim 16, wherein the base station antenna further comprises a dielectric substrate, the dielectric substrate has a first surface and a second surface, the feeding port is disposed on the first surface, and a signal ground is disposed on the second surface; and the antenna module is disposed on the dielectric substrate, and the antenna unit is connected to the signal ground.

18. The base station according to claim 12, wherein the feed mechanism comprises a plurality of feeding ports, a phase shifter, and a plurality of connection cables, and the antenna units in each antenna module is connected to a feeding port of the plurality of feeding ports through the corresponding feeders;

the phase shifter is provided with a plurality of output ports, a feeding port connected to each antenna module is connected to one corresponding output port through a corresponding connection cable that is in a one-to-one correspondence with the feeding port; each connection cable has a third sub-radiation phase slope;

for each the antenna module and the corresponding connection cable that are in a one-to-one correspondence, a sum of the radiation phase slopes of the radiating elements in the antenna module forms a module radiation phase slope; and a sum of the module radiation phase slope and the third sub-radiation phase slope forms a total radiation phase slope.

19. The base station according to claim 12, wherein the feed mechanism comprises a phase shifter, and the phase shifter is provided with a plurality of output ports; and the antenna unit in the antenna module is connected to an output port through the corresponding feeder, and the antenna units in the antenna module are connected to different output ports.

20. The base station according to claim 12, wherein the base station antenna further comprises a reflection plate, wherein the reflection plate is located on a side of the antenna unit away from a radiation direction of the antenna unit.

* * * * *